US008900002B2

(12) United States Patent
Mooney et al.

(10) Patent No.: US 8,900,002 B2
(45) Date of Patent: *Dec. 2, 2014

(54) ADJUSTABLE ELECTRICAL BUSWAY JOINT

(75) Inventors: Brian Frederick Mooney, Colchester, CT (US); Michael Richard Wood, Southington, CT (US); Jeffrey Lynn Cox, Selmer, TN (US); Gerald Witkoski, Burlington, CT (US); Mariusz Duda, Winsor Locks, CT (US); Mark Schatz, Plainville, CT (US)

(73) Assignee: General Electric Company, Schenectady, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/338,465

(22) Filed: Dec. 28, 2011

(65) Prior Publication Data

US 2013/0171849 A1 Jul. 4, 2013

(51) Int. Cl.
*H01R 4/60* (2006.01)
(52) U.S. Cl.
USPC ........................................................ 439/212
(58) Field of Classification Search
USPC .................. 439/212, 213; 174/68.2, 86, 88 B
See application file for complete search history.

(56) References Cited

U.S. PATENT DOCUMENTS

| | | | |
|---|---|---|---|
| 3,031,521 A | 4/1962 | Krauss | |
| 3,462,541 A | 8/1969 | Davis | |
| 3,559,148 A | 1/1971 | Hafer | |
| 4,728,752 A | 3/1988 | Hicks, Jr. | |
| 4,849,581 A | 7/1989 | Larkin | |
| 4,950,841 A | 8/1990 | Walker | |
| 5,442,135 A | 8/1995 | Faulkner | |
| 5,783,779 A | 7/1998 | Graham | |
| 5,785,542 A | 7/1998 | Johnson | |
| 5,821,464 A | 10/1998 | Graham | |
| 7,718,895 B2 | 5/2010 | Rodriguez | |
| 8,540,526 B2 * | 9/2013 | Mooney et al. | ................ 439/213 |
| 2008/0105451 A1 | 5/2008 | Rodriguez | |

FOREIGN PATENT DOCUMENTS

| | | |
|---|---|---|
| DE | 102009032619 A1 | 1/2011 |
| EP | 0933855 B1 | 5/2001 |
| WO | 2011067647 A2 | 6/2011 |

OTHER PUBLICATIONS

"Medium Voltage Busbar Trunking Systems Busway 'Cr". DBTS Industries SDN. BHD., product catalog, pp. 1-10.
"Pow-R-Way III Low Voltage Busway", Eaton Corporation, product catalog, pp. 1-11.
Search Report and Written Opinion from EP Application No. 12197434.9 dated May 31, 2013.

* cited by examiner

*Primary Examiner* — Khiem Nguyen
(74) *Attorney, Agent, or Firm* — GE Global Patent Operation; Stephen G. Midgley

(57) ABSTRACT

An adjustable busway joint for coupling two longitudinally aligned busway sections is disclosed. The adjustable joint has a first plurality of electrically conductive splice plates defining a splice plate adjustment slot, and a second plurality of electrically conductive splice plates defining an aperture, wherein each splice plate of the second plurality of splice plates is disposed to overlap a portion of a corresponding splice plate of the first plurality of splice plates to form an electrical joint, and wherein the aperture is sized and disposed to overlap at least a portion of the first splice plate adjustment slot. The joint additionally has a first clamping member disposed through the splice plate adjustment slot and the aperture such that the first and said second pluralities of splice plates are operably movable with respect each other between a first compressed position and a second extended position.

10 Claims, 21 Drawing Sheets

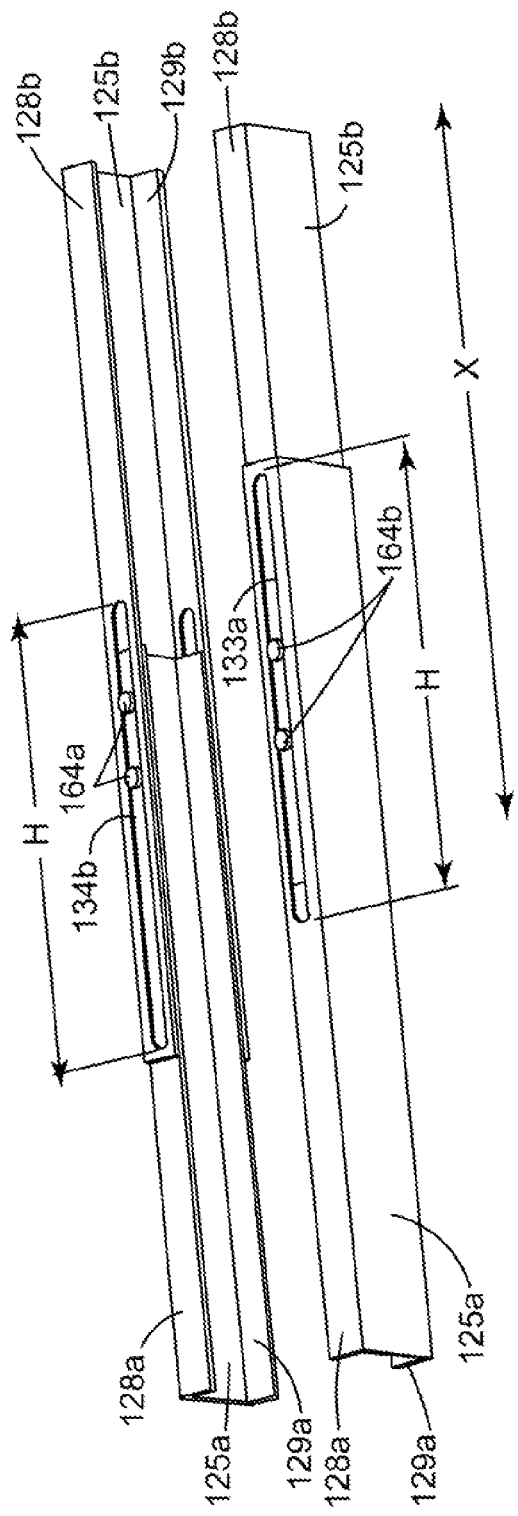

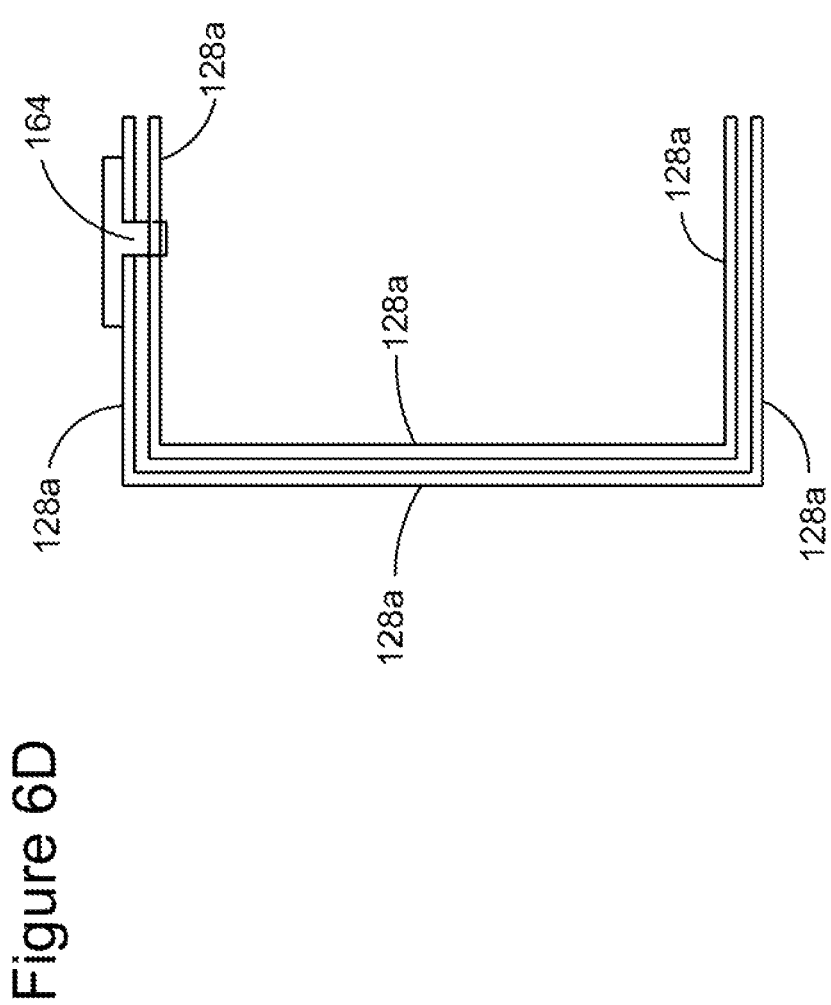

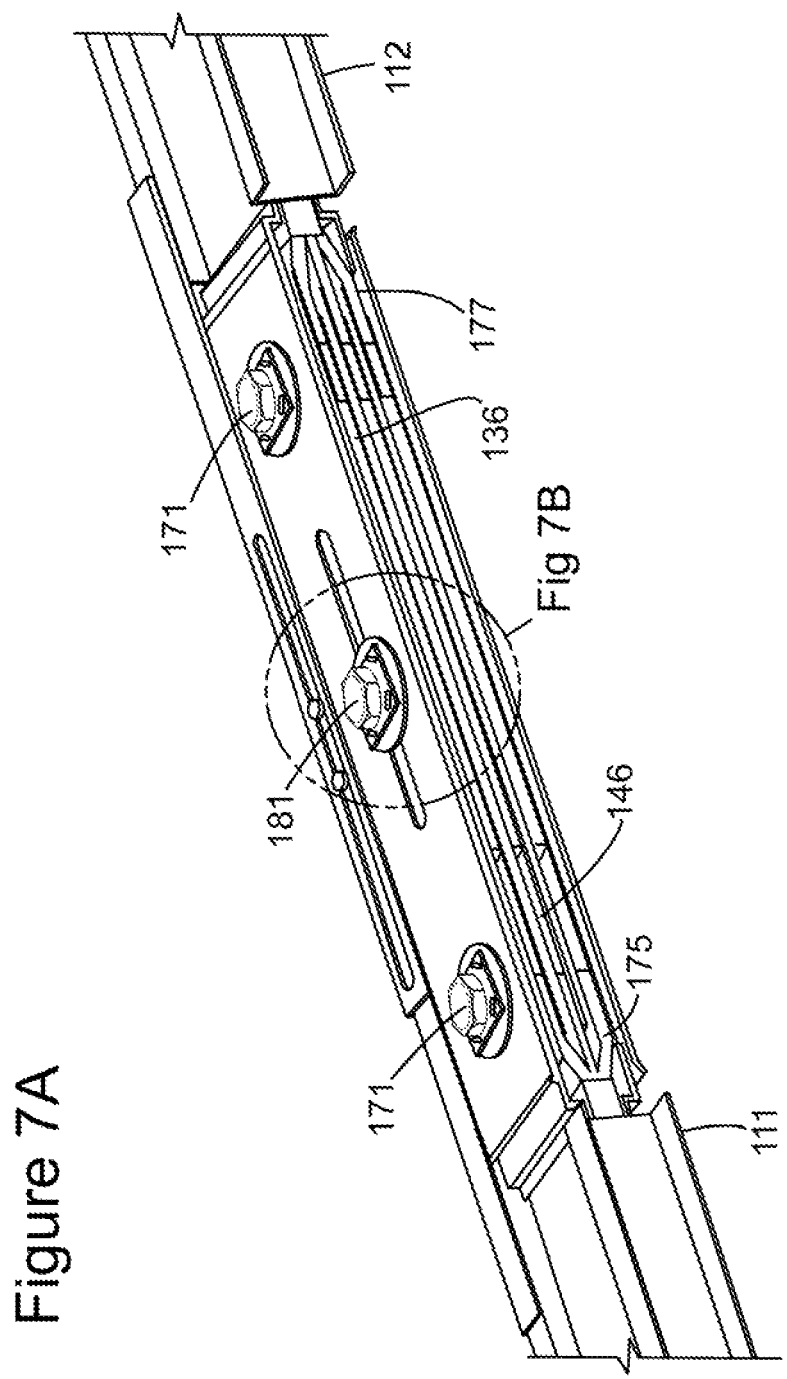

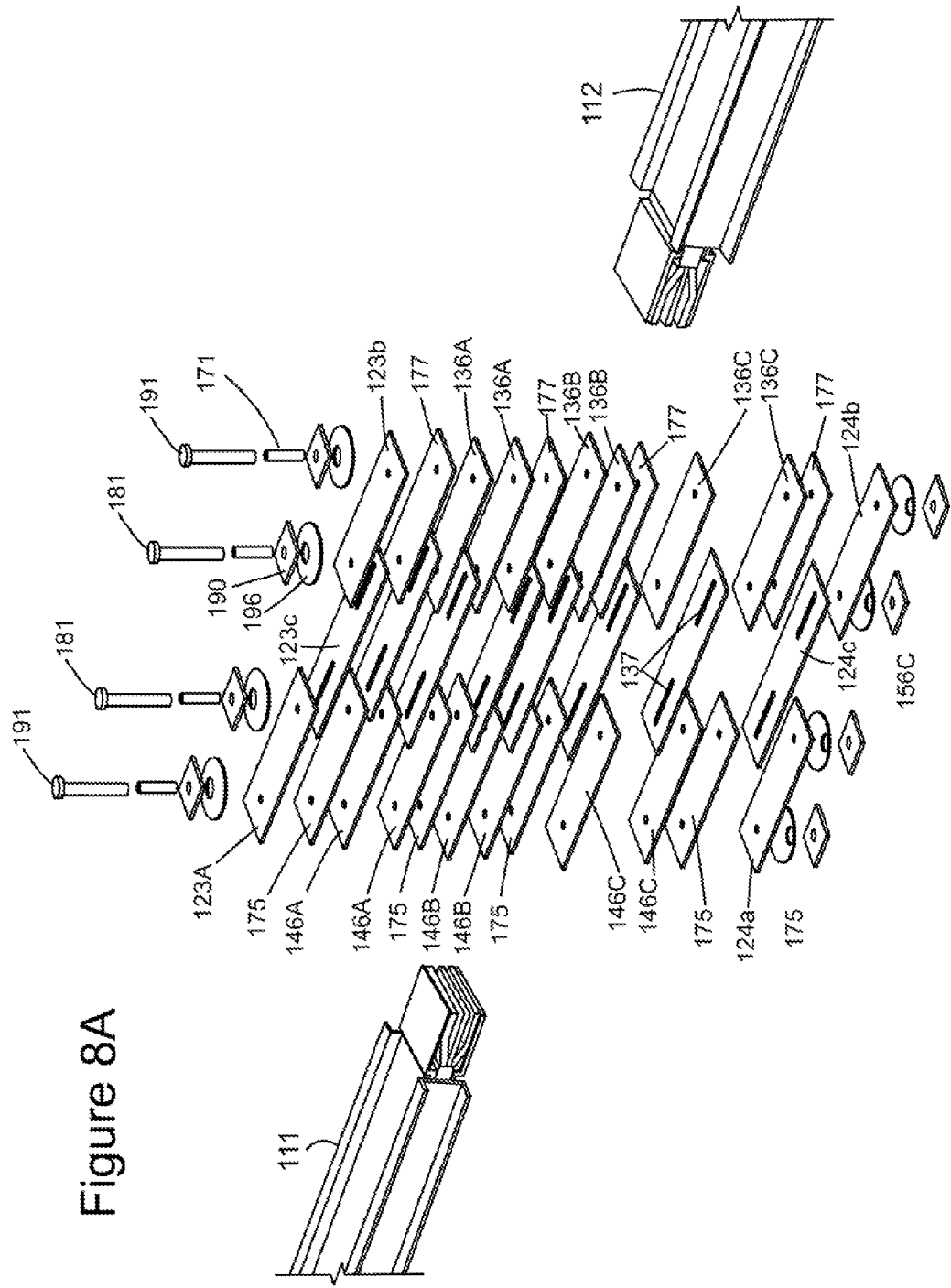

ADJUSTABLE ELECTRICAL BUSWAY JOINT

BACKGROUND OF THE INVENTION

The embodiments described herein relate generally to electrical busway and, more particularly, to an adjustable joint for joining electrical busway sections.

Elongated rectangular flat conductive bus bar members are conventionally insulatively arranged within electrical busway sections for transporting multi-phase high current electric power through industrial establishments. Successive elongate busway sections are electrically connected or interlocked together in end-to-end relation to provide electrical continuity between a power source and a power consuming load.

When longitudinally aligned busway sections are electrically interconnected in a conventional installation, a self-contained busway joint is typically employed. In order to preserve the thermal properties of the individual busway sections, the busway joint is conventionally constructed with electrically conductive splice plates and interleaving insulative plates fixedly held together by insulative bolts.

Busway sections are generally manufactured and distributed in the form of pre-manufactured fixed-length sections, so that a number of such electrical busway joints are required to install an extended length busway run in an industrial facility. At each junction between two fixed-length busway sections, a busway joint is necessary to electrically connect the two busway sections.

In many cases, the fixed-length sections do not match the specific length required for a given installation. As a result, custom length busway joints need to be manufactured, adding significant cost and time to the installation. For example, installers typically need to order non-standard or custom length bus way sections or joints to complete an installation. The custom length busway sections typically need to be manufactured to a specified length and the installer has to wait until it is delivered to finish installation of the busway run.

It would be desirable to provide a busway joint having an adjustable length to cooperate with adjacent longitudinally aligned busway sections to eliminate the need for a custom length busway sections. It would further be desirable to provide a busway system that allows an installer to order an adjustable busway joint at the same time as ordering the busway section.

Additionally it would be desirable to provide an adjustable length busway joint that permits replacement of a single busway section in a run without the need to remove other abutting busway sections from the end-to-end relationship. It would also be preferable to provide a longitudinally adjustable busway joint instead of a longitudinally adjustable busway section.

BRIEF DESCRIPTION OF THE INVENTION

A busway system is disclosed comprising two longitudinally aligned busway sections, and in combination with each busway section there is provided a busway joint which is longitudinally movable relative to the busway sections between a first length whereat the joint is compressed, and a second length whereat the joint is extended to a point which permits adjacent busbar ends of each section to be clamped together by the joint to establish the electrical joint.

In an embodiment, a busway joint for coupling two longitudinally aligned busway sections is disclosed. The busway joint includes a first plurality of electrically conductive splice plates disposed in spaced apart substantially parallel relationship, each splice plate of the first plurality of splice plates defining a first splice plate retaining portion. The joint also includes a second plurality of electrically conductive splice plates disposed in spaced apart substantially parallel relationship, each splice plate of said second plurality of splice plates defining a first splice plate adjustment portion substantially longitudinally aligned with and disposed to overlap a portion of a corresponding splice plate of said first plurality of splice plates to form an electrical joint, wherein each said splice plate adjustment portion is sized and disposed to overlap at least a portion of said first splice plate retaining portion. The busway joint further includes a first positioning member disposed in said first splice plate adjustment portion and said first splice plate retaining portion, said first and said second pluralities of splice plates being arranged for a longitudinal movement with respect each other between a first compressed position and a second extended position.

In another embodiment, a busway system is disclosed. The busway system includes a first busway section, a second busway section longitudinally aligned with said first busway section, and a busway joint disposed between and operative to couple said first and said second busway sections. The busway joint includes a first plurality of electrically conductive splice plates disposed in spaced apart substantially parallel relationship, each splice plate of the first plurality of splice plates defining a first splice plate retaining portion. The joint also includes a second plurality of electrically conductive splice plates disposed in spaced apart substantially parallel relationship, each splice plate of said second plurality of splice plates defining a first splice plate adjustment portion substantially longitudinally aligned with and disposed to overlap a portion of a corresponding splice plate of said first plurality of splice plates to form an electrical joint, wherein each said splice plate adjustment portion is sized and disposed to overlap at least a portion of said first splice plate retaining portion. The busway joint further includes a first positioning member disposed in said first splice plate adjustment portion and said first splice plate retaining portion, said first and said second pluralities of splice plates being arranged for a longitudinal movement with respect each other between a first compressed position and a second extended position.

BRIEF DESCRIPTION OF THE DRAWINGS

FIG. 6A is a perspective view of an exemplary embodiment of the first and second side surfaces of the housing of the busway joint of FIG. 2A in a second extended position.

FIG. 6D is an end view of the alternative exemplary embodiment of FIG. 6C.

FIG. 7A is a perspective view of the busway system of FIG. 3, according to an embodiment, in a second extended position with one of the busway joint housing sides removed for clarity.

FIG. 8A is a perspective view of a busway system according to an alternative embodiment, in an unconnected state with the busway joint shown in exploded view.

DETAILED DESCRIPTION OF THE INVENTION

As used in this description and in the claims which follow, the term "phase" shall be taken to include all conductors in different runs of any particular busway, bus duct, or bus joint which carry the same electrical phase, and including those conductors which are used to carry any neutral or ground phase.

Various embodiments disclosed herein provide a busway joint which is adjustable by a user to any desired length. Embodiments use a splice-plate style pressure joint to couple two longitudinally aligned busway sections. The splice plates comprising the joint are longitudinally moveable with respect to each other between a first compressed position and a second extended position such that the busway joint length is likewise adjustable. Exemplary embodiments comprise a first set of splice plates, each respectively defining a first aperture arranged to define a first retaining portion, and a second set of splice plates each respectively defining a second aperture arranged to define a first adjustment portion. The first and second sets of splice plates, and the first retaining and first adjustment portions are respectively disposed to overlap, and a positioning member is disposed in the overlapping first retaining and first adjustment portions. The first retaining and second adjustment portions and positioning member cooperate to at least partially define the distance between the first compressed position and the second extended position. Once the busway joint is adjusted to a desired length, it is the positioning member is fixedly clamped to prevent undesired length adjustment. Subsequent adjustment of busway joint length may be made after releasing or loosening the positioning member with respect to the splice plates. In some embodiments, metal housing surfaces or plates are used to enclose the splice plates, and may similarly be moveable with respect to each other between a first compressed position and a second extended position such that the busway joint length is likewise adjustable.

Figure 1:
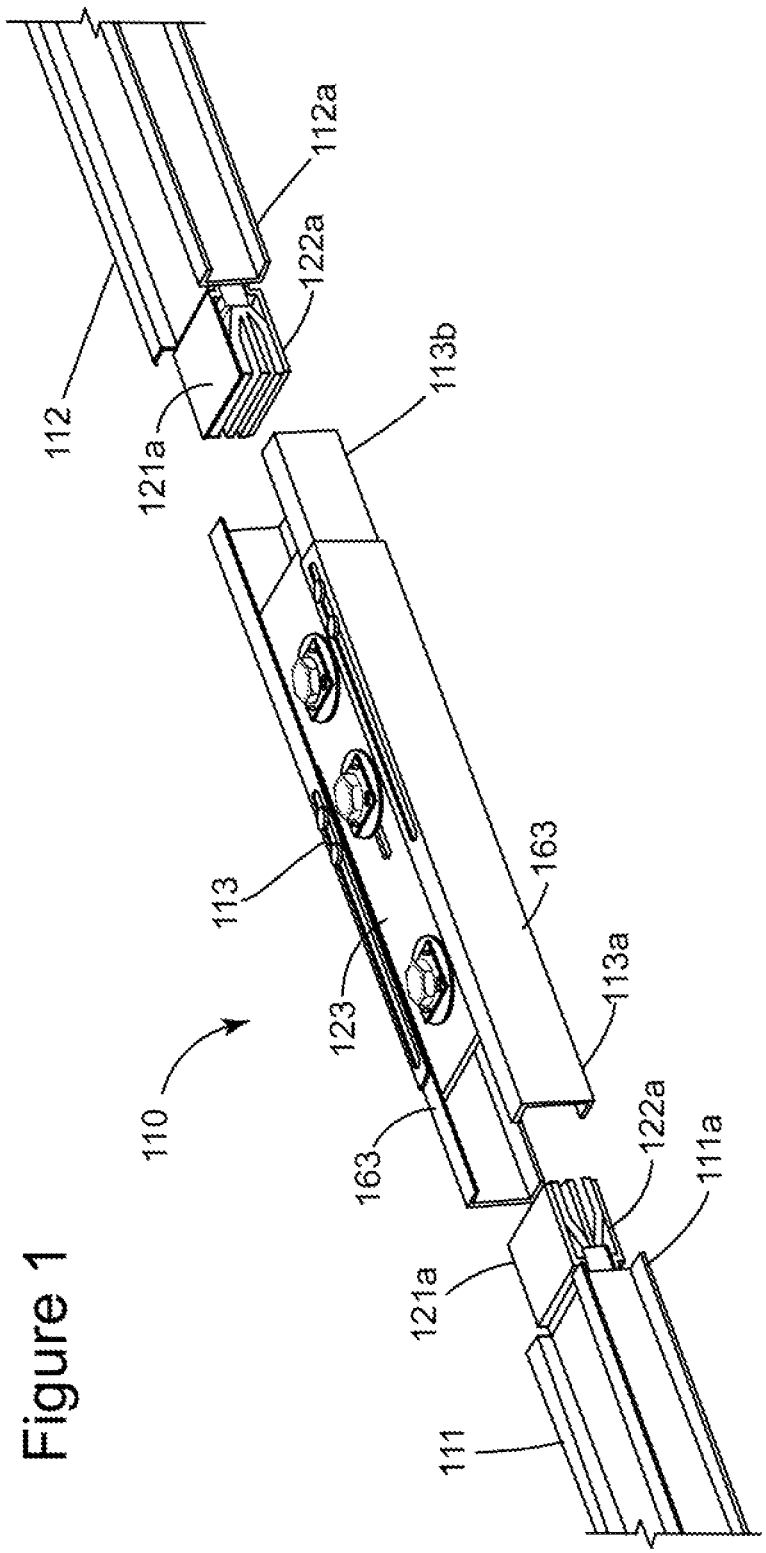
FIG. 1 is a perspective view of a busway system in an unconnected state according to an exemplary embodiment.

According to an embodiment, as shown in FIG. 1, a busway system 110 comprises an elongate first busway section 111, and an elongate second busway section 112 joinable in a substantially longitudinally aligned, end-to-end relation between an electric power source (not shown) and a load (not shown) via a separate removable and longitudinally adjustable busway joint 113. In one embodiment, the busway system 110 is configured to connect to a conventional 3-phase electrical distribution system (not shown). In other embodiments, busway system 110 may be configured to connect with an electrical distribution system having any number of AC electrical phases. In still other embodiments, busway system 110 may be configured to connect with a DC electrical distribution system.

Figure 2:
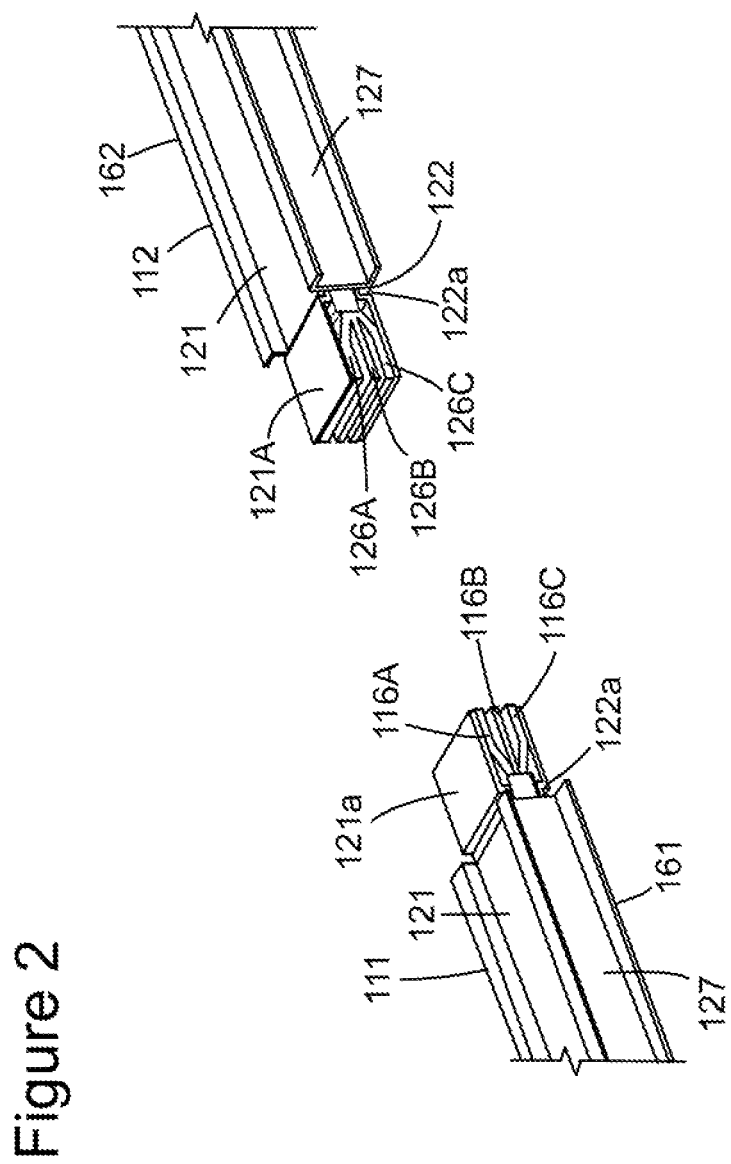
FIG. 2 is a perspective view of the exemplary embodiment of the busway system of FIG. 1 with the busway joint removed for clarity.
Figure 2A:
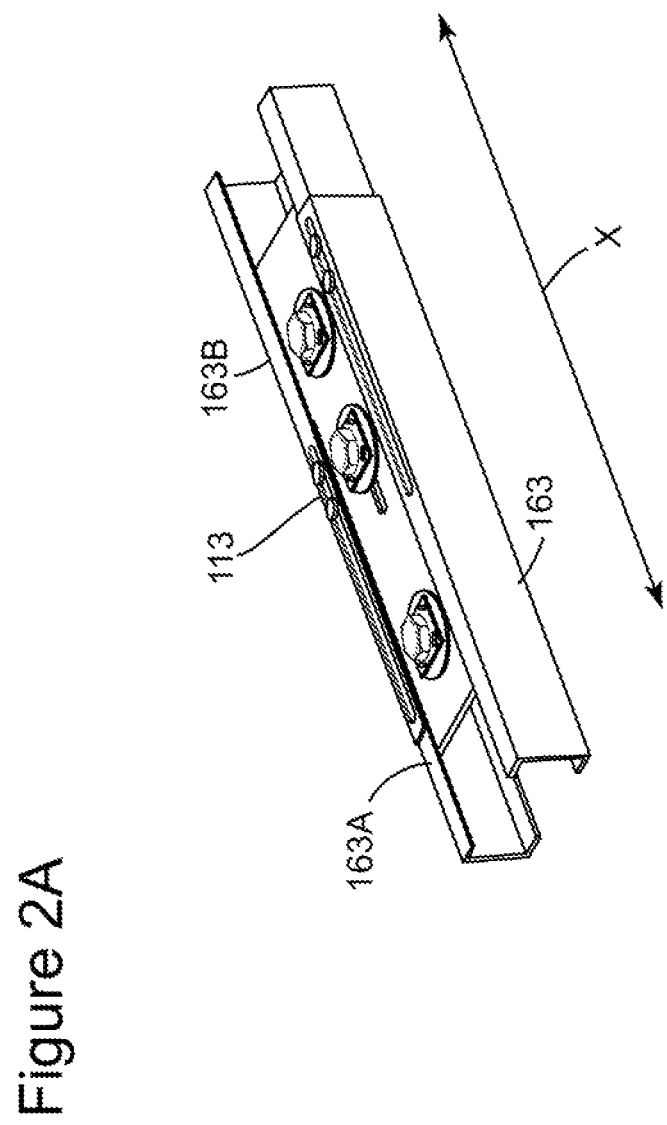
FIG. 2A is a perspective view of a busway joint according to an embodiment.

In an embodiment, as illustrated in FIG. 2, first busway section 111 comprises an elongate busway housing 161 and a plurality of runs of generally flat elongate bus bars 116A, 116B, and 116C positioned within the busway housing 161. In an embodiment, each of the bus bars 116A-116C are associated with a specific electrical phase of an electrical distribution system, and configured for operable connection with a corresponding phase, ground, or neutral bus within the electrical distribution system. In other embodiments, each of the plurality of bus bars 116A-116C may comprise a plurality of electrically coupled bus bars, each set being associated with a specific electrical phase, ground, or neutral of the electrical distribution system.

Similarly, in an embodiment, the second busway section 112 comprises an elongate housing 162 and a plurality of runs of generally flat elongate bus bars 126A, 126B, and 126C, positioned within the housing 162. In an embodiment, each of the bus bars 126A-126C are associated with a specific electrical phase of an electrical distribution system, and configured for operable connection with a corresponding phase, ground, or neutral bus within the electrical distribution system. In other embodiments, each of the plurality of bus bars 126A-126C may comprise a plurality of electrically coupled bus bars, each set being associated with a specific electrical phase, ground, or neutral of the electrical distribution system.

While the first and second busway sections 111, 112 are shown in the figures and discussed herein as each comprising three bus bars, it should be understood that other embodiments are not so limited and first and second busway sections 111, 112 may each comprise any desired number of busbars and any desired number of busbars per electrical phase, ground, or neutral that enables busway system 110 to function as described herein.

Figure 4:
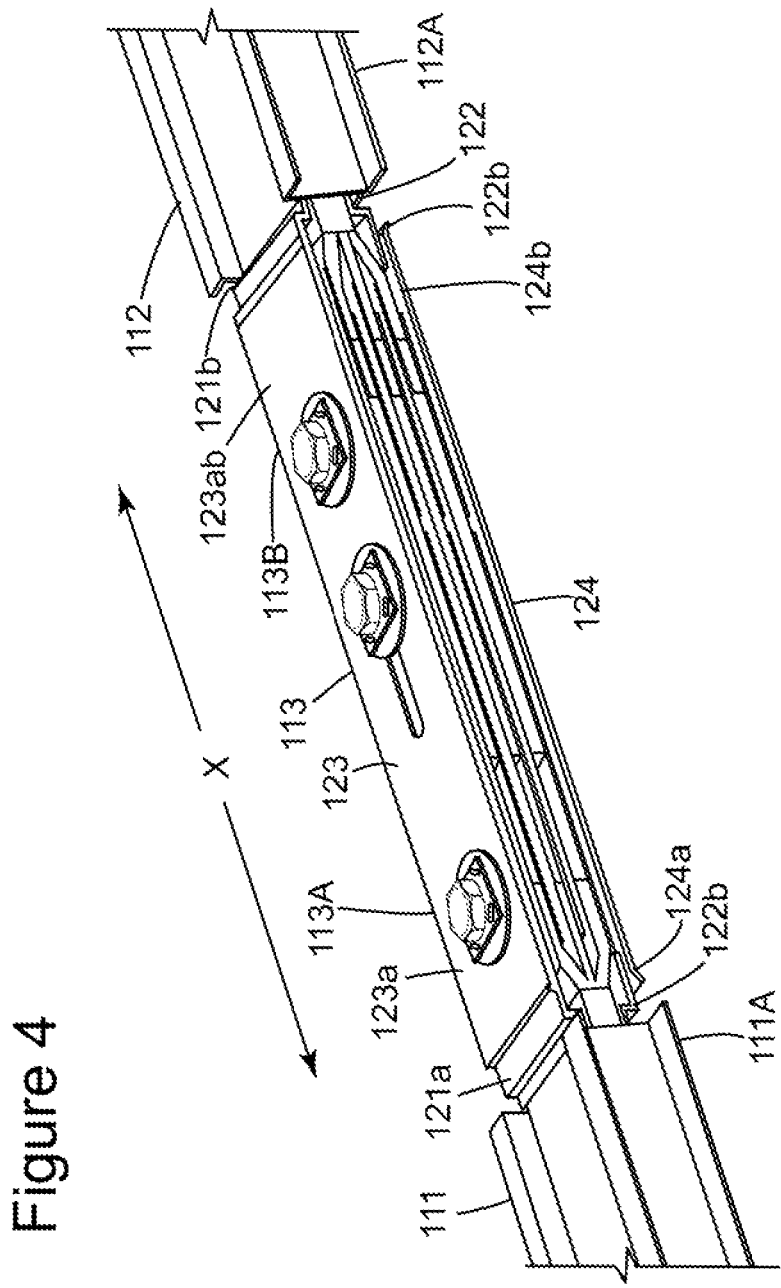
FIG. 4 is a perspective view of an exemplary embodiment of the busway system of FIG. 3 with the busway joint housing sides removed for clarity.

In an embodiment, as illustrated in FIG. 2, the busway section housing 161 includes a busway top cover 121 and a busway bottom cover 122 that cooperate with a pair of opposing busway side covers 127. In some embodiments, the busway housing top and bottom covers 121, 122 may each comprise a respective busway top and bottom cover transition portion 121a, 122a. The respective busway top and bottom cover transition portions 121a, 122a are configured to cooperate with a housing 163 of the busway joint 113. The busway housing 161 may be formed of rigid non-ferrous material such as aluminum. When operatively installed, busway top cover 121 and busway bottom cover 122 are configured to be fixedly coupled with a respective top and bottom surface 123, 124 of the busway joint 113 (FIG. 4). In various embodiments, the top cover 121 and bottom cover 122 may be fixedly coupled with the respective top and bottom surfaces 123, 124 of the busway joint 113 via any means, such as fastening, riveting strapping, bolting, gluing, and the like that enables the busway system to function as described herein. For example, each busway housing 161, 162 top cover 121 and bottom cover 122 may be fixedly coupled to the respective busway joint top surface 123 and bottom surface 124 with a fastener such as a bolt (not shown). The busway housings 161, 162 are arranged to prevent ingress of dust and contaminants into an interior of the respective busway sections 111, 112 and to operably prevent inadvertent contact with electrically live busbars 116A-116C, 126A-126C by a user. In an embodiment, busway housing 162 may be identical to busway housing 161. Busway housing side covers 127 may be fixedly coupled to the respective busway top cover 121 and bottom cover 122 via any means, such as fastening, riveting strapping, bolting, gluing, and the like that enables the busway system to function as described herein. For example, the busway side covers 127 may be fixedly coupled to the respective busway top cover 121 and bottom cover 122 with a fastener such as a bolt (not shown).

Figure 3:
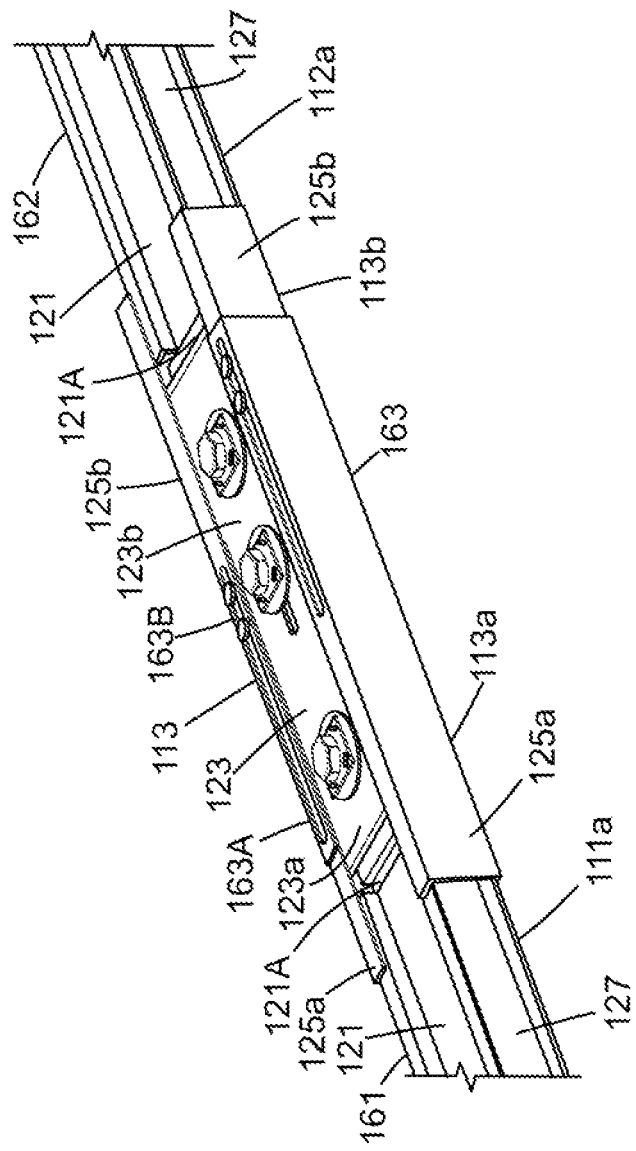
FIG. 3 is a perspective view of the exemplary embodiment of the busway system of FIG. 1 in a connected state.

With reference to FIG. 3 and FIG. 4 an embodiment of the busway system 110 is illustrated, and in FIG. 4 portions of the busway joint housing 163 are removed for clarity. A first end 111a of first busway section 111 is operably configured to connect with a first end 113a of the busway joint 113, and a first end 112a of second busway section 112 is configured to operably connect with a second end 113b of busway joint 113. The elongate busway joint is configured to be operably disposed in substantially longitudinal alignment with the aligned busway sections 111, 112. The separate busway joint 113 is configured to be longitudinally or telescopically adjustable to couple, (for example by clamping together into a pressure type electrical joint) the corresponding bus bar ends in the two successive busway sections 111, 112. With the busway joint 113 being positioned at one end of each busway section 111, 112, the first busway section 111 and the second busway section 112 are electrically coupleable in an end-to-end relation between an electric power source and a load.

In various embodiments, the adjustable length busway joint 113 comprises a busway joint housing 163. Busway joint housing 163 is arranged to prevent ingress of dust and contaminants into an interior of busway joint 113, and to operably prevent inadvertent contact by a user with the conductors therein. In an embodiment, joint housing 163 is formed of rigid non-ferrous material such as aluminum. The joint housing 163 is further arranged and configured for a longitudinal adjustment (i.e., along the direction indicated by the double headed arrow "X"), of the length of busway joint housing 163 between a first compressed position and a second extended position associated with a corresponding longitudinal adjustment between a first compressed position and a second extended position of the busway joint 113 length.

Figure 5:
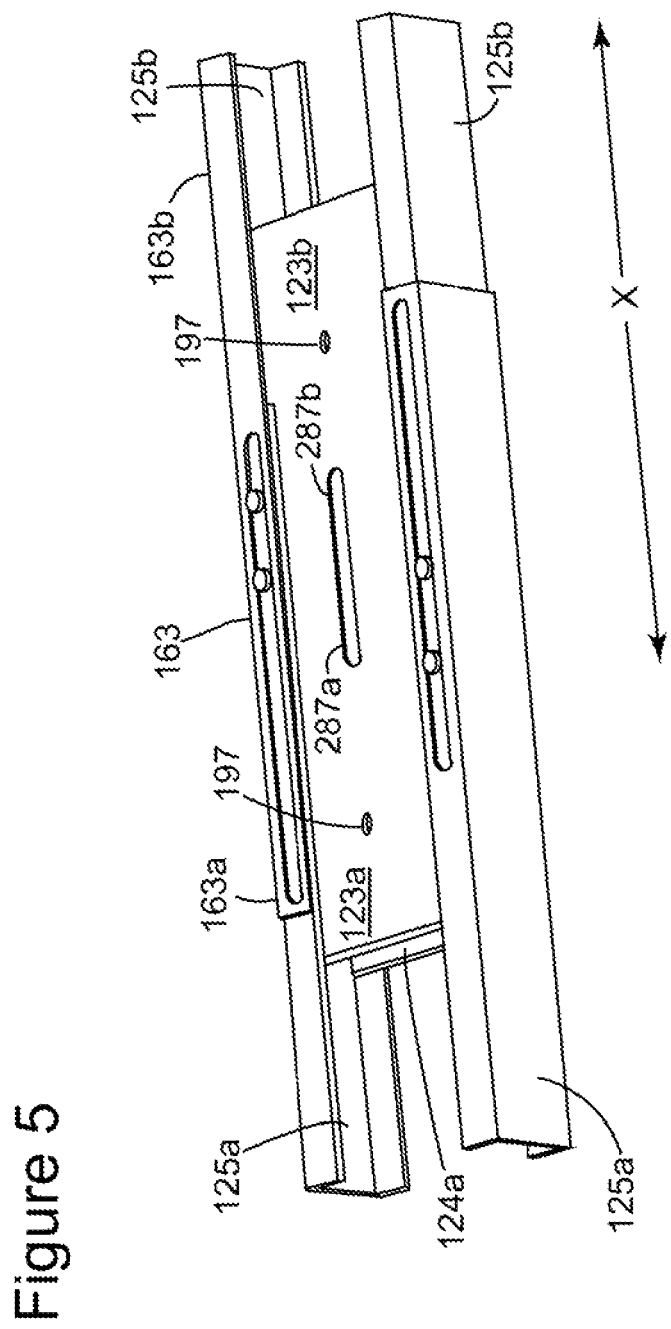
FIG. 5 is perspective view of an exemplary embodiment of the busway joint housing of the busway joint of FIG. 2A.
Figure 6:
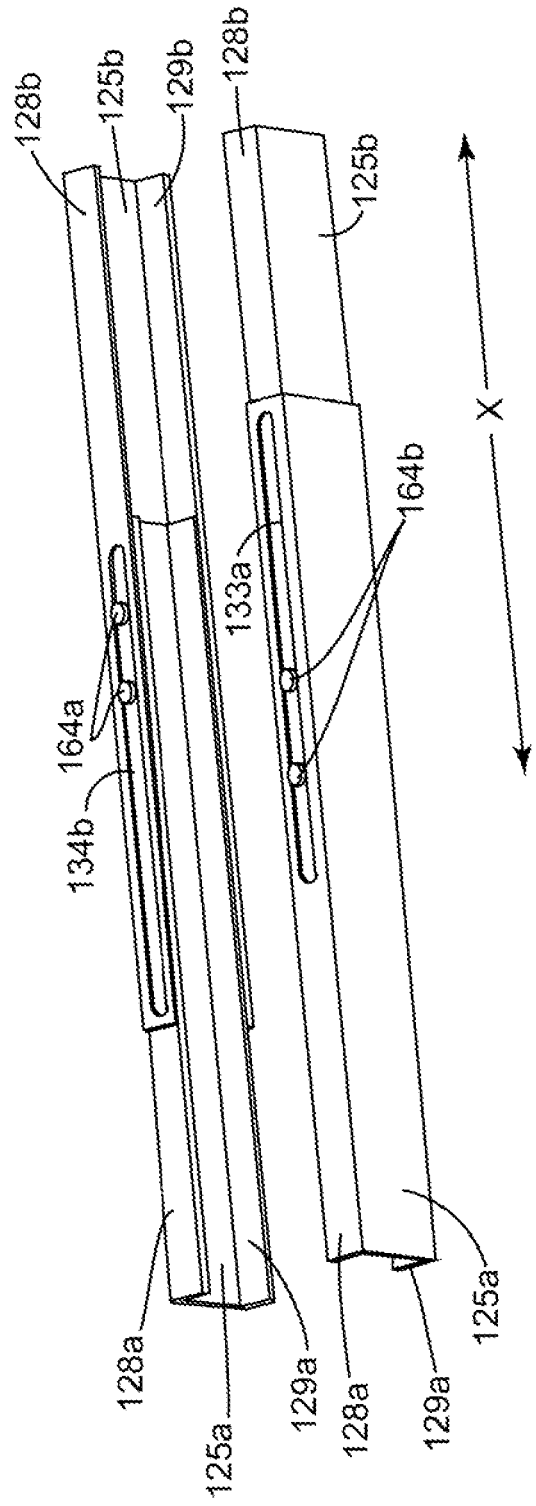
FIG. 6 is a perspective view of an exemplary embodiment of the first and second side surfaces of the housing of the busway joint of FIG. 2A in a first compressed position.

With reference to FIG. 5 and FIG. 6, in an embodiment, housing 163 consists of at least a first housing portion 163a, and a second housing portion 163b, the first and second housing portions 163a, 163b being disposed at opposing ends of housing 163. At least one of the housing portions first and second housing portions 163a, 163b is configured and arranged for movement with respect to the other between a first compressed position and a second extended position to enable a corresponding longitudinal adjustment between a first compressed position and a second extended position of the busway joint 113 length.

In an embodiment, the busway joint first and second housing portions 163a, 163b comprise a respective busway joint housing first and second top surface 123a, 123b disposed generally opposing a respective busway joint housing first and second bottom surface 124a, 124b (FIG. 4).

In other embodiments, the busway joint housing may comprise a joint housing third top surface 123c, and a busway joint housing third bottom surface 124c. (FIG. 8A). The joint housing third top surface 123c, is disposed between the busway joint housing first and second top surface 123a, 123b, and the joint housing third bottom surface 124c, is disposed between the busway joint housing first and second bottom surface 124a, 124b.

With reference to FIGS. 5, 6, 6A, first housing portion 163a further comprises two opposing busway joint first housing portion side surfaces 125a disposed on opposite sides of joint 113 between the housing portion first top surface 123a and housing portion first bottom surface 124a. Busway joint second housing portion 163b likewise comprises two respective opposing second housing portion side surfaces 125b disposed on opposite sides of joint 113 between the housing portion second top surface 123b and housing portion second bottom surface 124b. In an embodiment, the busway joint housing first, second, and third top and bottom surfaces 123a, 123b, 123c, 124a, 124b, 124c are oriented generally orthogonal to the respective housing portion side surfaces 125a, 125b.

In an embodiment, the busway joint housing first and second top surfaces 123a, 123b, and first and second bottom surfaces 124a, 124b are operably configured for longitudinal movement with respect each other, between a first compressed position and a second extended position. Likewise, in another embodiment, joint housing first and third top surfaces 123a, 123c, first and third bottom surfaces 123a, 124c, are operably configured for longitudinal movement with respect each other, between a first compressed position and a second extended position, and second and third top surfaces 123b, 123c, and second and third bottom surfaces 124b, 124c are operably configured for longitudinal movement with respect each other between a third compressed position and a fourth extended position. In an embodiment, each of the first, second, third, and fourth positions of the top and bottom surfaces 123a, 123b, 123c, 124a, 124b, 124c may be associated with one of a first compressed position and second expanded position of the busway joint 113 adjustment (i.e., along the direction indicated by the double headed arrow "X").

Figure 10:
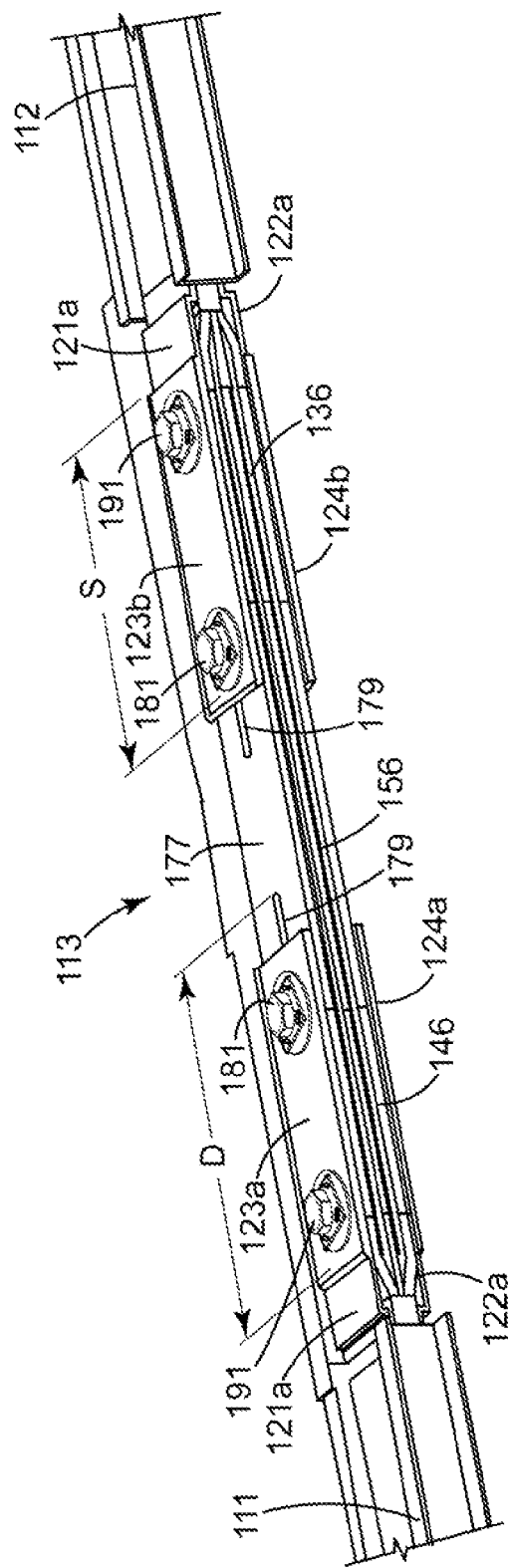
FIG. 10 is a perspective view of according to an alternative embodiment of a busway system, in a second extended position with one of the busway joint housing sides removed for clarity.

In an embodiment, the housing portion first and second top surfaces 123a, 123b are arranged and configured to cooperate with the corresponding housing portion first and second bottom surfaces 123b, 124b to enable adjustment of the length of busway housing 163. For example, in various embodiments, each the housing portion first and second top surfaces 123a, 123b, 124a, 124b and may each overlap at least a portion of one of the respective housing portion second top surface 123b and second bottom surface 124b, in both the first compressed and second extended positions of the busway joint 113. In another embodiment, when the busway joint housing 163 is in a first compressed position the corresponding housing portion first and second top surfaces 123*a*, 123*b*, and first and second bottom surfaces 124*a*, 121*b* are arranged in a non-overlapping end-to-end relationship, and when the busway joint housing 163 is adjusted to a second extended position, (FIG. 10), and a gap is defined between the housing portion first and second bottom surfaces 124*a*, 124*b*.

In other embodiments, the housing portion first and second top and bottom surfaces 123*a*,123*b*, and 124*a*,124*b*, are arranged and configured to cooperate with the third bottom surface 123*c* and third bottom surface 124*c* to enable adjustment of the length of busway housing 163. For example, in various embodiments, the housing portion first and second top and bottom surfaces 123*a*,123*b*, 124*a*,124*b* and may each overlap at least a portion of one of the respective housing portion second third surface 123*c* and third bottom surface 124*c* in both the first compressed and second extended positions of the busway joint 113.

Similarly, the first housing portion side surfaces 125*a* are arranged and configured to cooperate with a respective second housing portion side surfaces 125*b* to enable adjustment of the length of busway housing 163. For example, in various embodiments, as shown in FIGS. 6 and 6A, the first housing portion side surfaces 125*a* overlap at least a portion of the corresponding second housing portion side surface 125*b* in both the first compressed and second extended positions of the busway joint housing 163, in other embodiments, the respective first and second housing portion side surfaces 125*a*, 125*b* may not overlap. In still other embodiments, the respective first and second housing portion side surfaces 125*a*, 125*b* may overlap only in the first compressed position of joint housing 163. For example, in an embodiment, when the busway joint 113 is in a first compressed position the respective housing portion side surfaces 125*a*, 125*b* may be arranged in an overlapping end-to-end relationship, and when the busway joint housing 163 is adjusted to a second extended position, a gap (hot shown) is defined between the respective housing portion side surfaces 125*a*, 125*b*.

While the figures illustrate embodiments of the busway joint housing 163 as comprising two portions 163*a* and 163*b* it should be understood that other embodiments are not so limited and housing 163 may comprise any desired number of portions, including any desired number of surfaces that enables busway joint 113 to function as described herein.

Referring again to the embodiment illustrated in FIGS. 6 and 6A, each of the busway joint first housing portion side surfaces 125*a* may comprise a respective first housing portion first tab member 128*a*, oriented generally orthogonal to the respective side surface 125*a*; and a first housing portion second tab member 129*a*, oriented generally opposing the first housing portion first tab member 128*a* and orthogonal to the respective side surface 125*a*. Similarly, each of the second housing portion side surfaces 125*b* comprise a respective second housing portion third tab member 128*b*, oriented generally orthogonal to the respective second housing portion side surface 125*b*, and a second housing portion fourth tab member 129*b*, oriented generally opposing second housing portion second tab member 128*b* and orthogonal to the respective side surface 125*b*. Each of first housing portion first tab members 128*a* is disposed to operably cooperate with a corresponding second housing portion third tab member 128*b* that is disposed on the opposing end of the same side of joint housing 163. Likewise, each first joint housing portion second tab member 129*a* is disposed to operably cooperate with a corresponding second housing portion fourth tab member 129*b* that is disposed on opposing end of the same side of joint housing 163. For example, in an embodiment, each of the first housing portion first tab members 128*a* is operably disposed to overlap the corresponding second housing portion second tab member 128*b* disposed on the opposing end of the same side of joint housing 163, and each first housing portion second tab member 129*a* is disposed to overlap the corresponding second housing portion fourth tab member 129*b* disposed on opposing end of the same side of joint housing 163.

The busway joint housing first and second housing side surfaces 125*a*, 125*b* comprise respective first and second adjustment portions, 133, 134. In an embodiment, the first side surface adjustment portion 133 is disposed on the first housing portion first tab members 128*a*, and is sized and disposed to cooperate with and overlap at least a portion of a corresponding second side surface adjustment portion 134 disposed on second housing portion second tab member 128*b*. In other embodiments, the first and second side surface adjustment portions 133, 134 may be disposed on the respective first housing portion second tab members 129*a* and second housing portion fourth tab member 129*b*. In still other embodiments, first and second side surface adjustment portions 133, 134 may be disposed on both the respective first housing portion first and second tab members 128*a*, 129*a* and second housing portion third and fourth tab member 129*a*, 129*b*. In still other embodiments the first and second side surface adjustment portions 133, 134 may be disposed on the first and second side surfaces 125*a*, 125*b*.

Figure 6B:
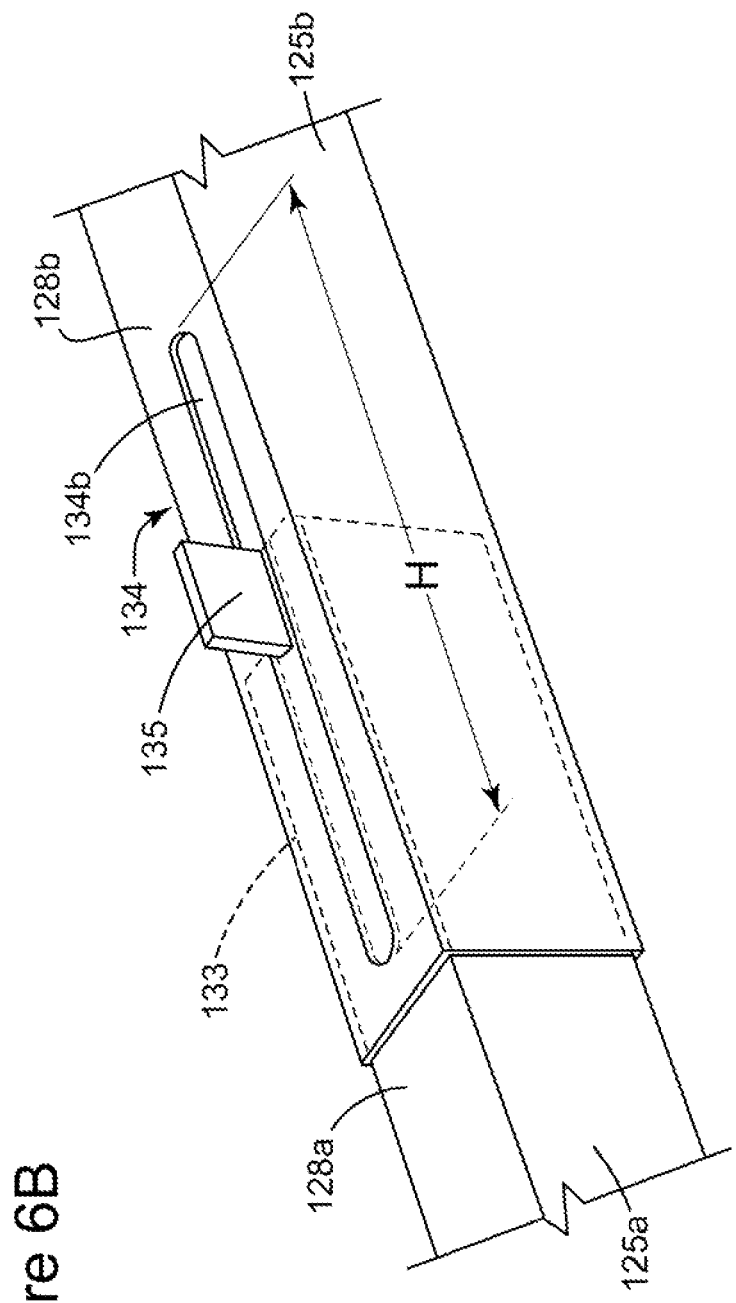
FIG. 6B is a perspective detail view of an exemplary embodiment of the first and second side surface adjustment portions of the housing of the busway joint of FIG. 2A in a first compressed position.

For example, in one embodiment, as illustrated in FIGS. 6A, 6B, and 6D, adjustment portion 133 is disposed on each of the two opposing side surfaces 125*a*. Specifically, in the embodiment, one first tab member 128*a* includes an adjustment portion 133 comprising a first slot 133*a* defined therethrough, and the other first tab member 128*a* includes an adjustment portion 133 comprising at least one first blocking member 164*a* rigidly coupled to first tab member 128*a*. Similarly, an adjustment portion 134 is disposed on each of the two opposing side surfaces 125*a*. Specifically, in this embodiment, one first tab member 128*b* includes an adjustment portion 134 comprising a second slot 134*a* defined therethrough, and the other first tab member 128*b* includes an adjustment portion 134 comprising at least one second blocking member 164*b* rigidly coupled to corresponding first tab member 128*b*. The first blocking member 164*a* is movably disposed in the corresponding adjustment portion second slot 134*b*, and the second blocking member 164*b* is movably disposed in the corresponding adjustment portion first slot 133*a*. By this arrangement, the blocking members 163*a*, 164*a* allow each of the first and second housing side surfaces 125*a*, 125*b* to slidably move with respect to the other, between a first compressed position and a second extended position to enable a corresponding longitudinal adjustment between a first compressed position and a second extended position of the busway joint 113 length, but also prevent an undesired lateral movement of the housing portions 163*a*, 163*b*. Additionally, with this arrangement, while the rigidly attached blocking members 163*a*, 164*a* allow the first and second housing side surfaces 125*a*, 125*b* to slidably move with respect to the other between a first compressed position and a second extended position, the blocking members 163*a*, 164*a* also prevent an undesired movement beyond at least one of the first compressed position and the second extended position.

The first and second side surface adjustment portions 133, 134 at least partially define the distance between the first compressed position and the second extended position of the busway housing 163. For example, in an embodiment having first and second side surface adjustment portions 133, 134 having a longitudinal dimension "H", the distance between the first compressed position and the second extended position of busway housing 163 is less than the longitudinal dimension "H". In an embodiment, as shown in FIG. 6A, each of the adjustment portion first and second slots 133a, 134b have a longitudinal dimension "H" arranged longitudinally along a portion of the first housing portion first tab members 128a.

Figure 6C:
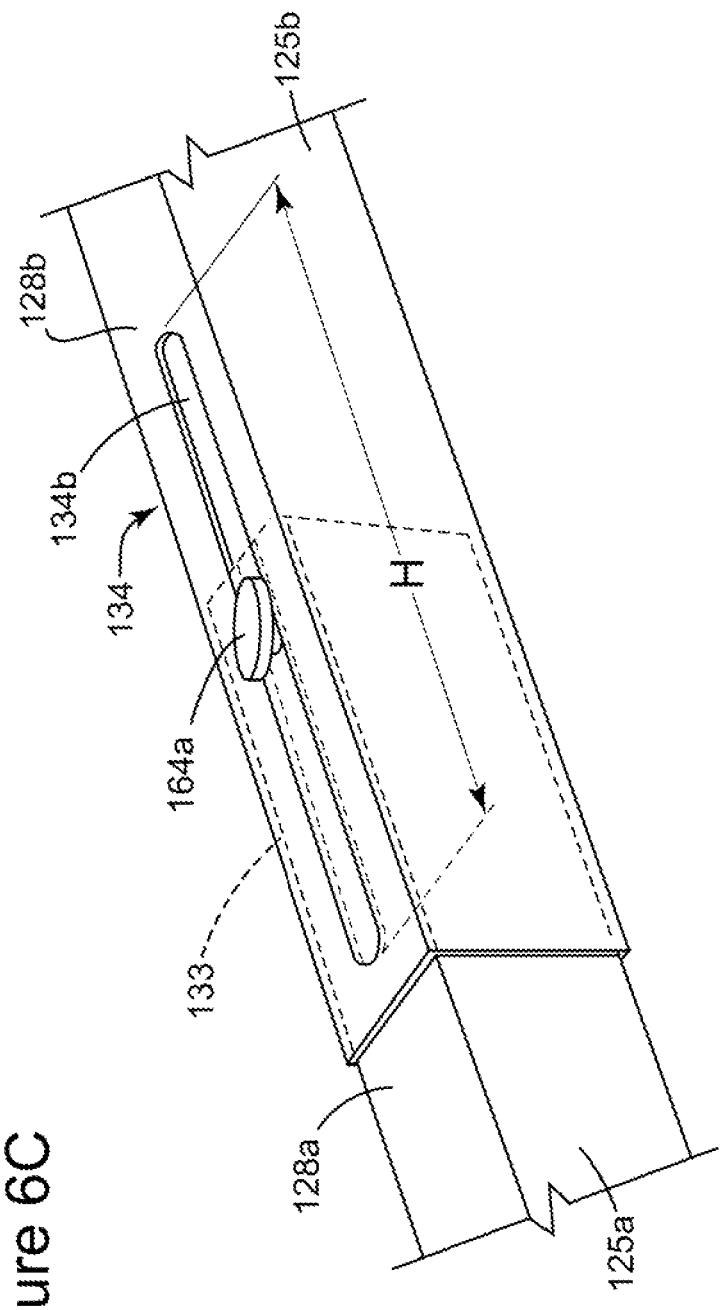
FIG. 6C is a perspective detail view of an alternative exemplary embodiment of the first and second side surface adjustment portions of the housing of the busway joint of FIG. 2A in a first compressed position.
Figure 6E:
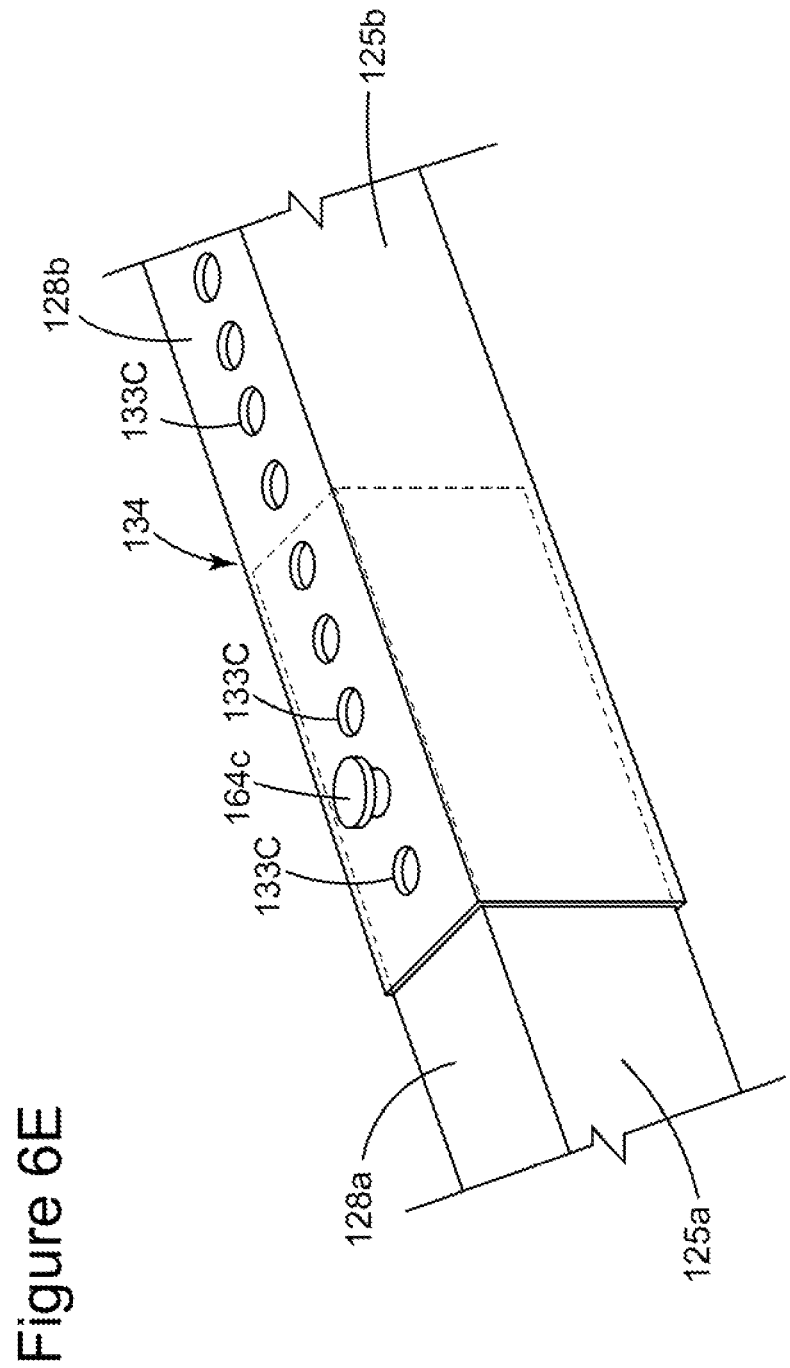
FIG. 6E is a perspective detail view according to an alternative embodiment of the first and second side surface adjustment portions of the housing of the busway joint of FIG. 2A in a first compressed position.

In another embodiment, as illustrated in FIGS. 6B and 6C, the second side surface adjustment portions 134 each define a second housing portion aperture 134b arranged longitudinally along a portion of the second housing portion second tab members 129b. In yet another embodiment, as illustrated in FIG. 6E at least one of the first and second side surface adjustment portions 133, 134 define a plurality of apertures 133c distributed longitudinally along the respective first and second tab member 128a, 128b. As shown in FIG. 6E, when the length of housing 163 is adjusted to a desired one of a first compressed position and a second extended position in which at least one of the plurality of apertures 133c on first tab member 128a at least partially aligns with or overlaps one of the plurality of apertures 133c on second tab member 128b, then a blocking member 164, such as for example a pin 164c, is operably disposed in the overlapping apertures 133c. By this arrangement, the relative positions of the first and second housing side surfaces 125a, 125b is fixed and a lateral adjustment of the busway joint 113 length beyond the longitudinal dimension "H" is prevented.

In yet another exemplary embodiment, as shown in FIG. 6B, the first side surface adjustment portion 133 comprises blocking member 164 is formed as a tab member 135 and disposed generally orthogonal to top surface 123. Tab member 135 is configured to be operably disposed in the second housing aperture 134b to retain the relative positions of the first and second housing portions 163a, 163b and prevent a lateral adjustment of the busway joint 113 length beyond the longitudinal dimension "H.".

Additionally, in an embodiment, when the busway joint housing 163 is longitudinally adjusted by a user from a first length to a desired second length, to retain the relative positions of the first and second housing portions 163a, 163b and prevent an undesired lateral adjustment of the busway joint 113 length, the busway joint first and second housing portion side surfaces 125a, 125b may be fixedly coupled to the adjacent respective busway section 111, 112 housing side covers 127 via any desired means, such as fastening, riveting strapping, bolting, gluing, and the like that enables the busway system to function as described herein. For example, busway joint first and second housing portion side surfaces 125a, 125b may be fixedly coupled to the respective busway housing side covers 127 top cover 121 and bottom cover 122 with a fastener such as a bolt (not shown).

In various alternative embodiments, the housing 163 may comprise and number of side surfaces 125a, 125b that enables busway joint 113 to function as described herein. For example, in one embodiment housing 163 further comprises at least two opposing third side surfaces 103 (not shown), each third side surface 103 disposed to overlap a first portion of a corresponding one of the first housing portion side surfaces 125a and a second portion of a corresponding one of the second housing portion side surfaces 125b. Each side plate 103 (not shown), may additionally define at least one third housing adjustment portions 139 (not shown), such as aperture 139c (not shown), sized and disposed to operably overlap with at least a portion of at least one of the first and second side surface adjustment portions 133, 134. The third housing adjustment portions 139 (not shown), is configured to at least partially define the distance between the first compressed position and the second extended position of the busway housing 163.

Referring to FIGS. 7 through 10, in an embodiment the busway joint 113 comprises a first splice plate portion 146, a second splice plate portion 136. In other embodiments, busway joint 113 comprises a third splice plate portion 156. In still other embodiments, it is contemplated that any desired number of splice plate portions, having any desired number of retaining portions and any desired number of adjustment portions, may be used that enable busway joint 113 to function as described herein. Moreover, while the first, second, and third splice plate portions 146, 136, 156 are shown in the figures and discussed herein as each comprising specific numbers of splice plates, it should be understood that other embodiments are not an limited the splice plate portions 146, 136, 156 may each comprise any desired number of splice plates and any desired number of splice plates per electrical phase or neutral, that enables busway system 110 to function as described herein.

The first splice plate portion 146 of the busway joint 113 comprises a first plurality of substantially flat elongate conductive splice plates 146A, 146B, and 146C, disposed in spaced apart substantially parallel relationship and positioned within the housing 163. In an embodiment, each of the first plurality of splice plates 146A-146C is formed of non-ferrous conductive material such as copper or aluminum and disposed generally at a first end 113a of the busway joint 113.

The second splice plate portion 136 of the busway joint 113 comprises a second plurality of substantially flat elongate conductive splice plates 136A, 136B, and 136C, disposed in spaced apart substantially parallel relationship and positioned within the housing 163. In an embodiment, each of the second plurality of splice plates 136A-136C is formed of non-ferrous conductive material such as copper or aluminum and disposed generally at a second end 113b of the busway joint 113.

In an embodiment, the third splice plate portion 156 of the busway joint 113 comprises a first plurality of substantially flat elongate conductive splice plates 156A, 156B, and 156C, disposed in spaced apart substantially parallel relationship and positioned within the housing 163. In an embodiment, each of the first plurality of splice plates 156A-156C is formed of non-ferrous conductive material such as copper or aluminum and disposed generally at a second end 113b of the busway joint 113, such that second splice plate portion 136 is disposed generally between the first and second splice plate portions 116, 156

In an embodiment, a first end of each of the first plurality of splice plates 146A-146C is arranged to interleave or overlap with a corresponding one of the bus bars 116A-116C of the first busway section 111 to form a corresponding electrically coupled fixed joint. A second end of each of the first plurality of splice plates 146A-146C is arranged to interleave or overlap with a first end of a corresponding one of the second plurality of splice plates 136A-136C to form a corresponding electrically coupled slidable joint.

In an embodiment, a second end of each of the second plurality of splice plates 136A-136C is arranged to interleave or overlap with a corresponding one of the bus bars 126A-126C of the second busway section 112 to form a corresponding electrically coupled fixed joint. The second end of each of the second plurality of splice plates 136A-136C is arranged to interleave or overlap with a first end of a corresponding one of the third plurality of splice plates 156A-156C to form a corresponding electrically coupled slidable joint.

In another embodiment, the a first end of each of the third plurality of splice plates 156A-15C is arranged to interleave or overlap with the second end of a corresponding one of the second plurality of splice plates 136A-136C to form a corresponding electrically coupled slidable joint. A second end of each of the third plurality of splice plates 156A-156C is arranged to interleave or overlap with a corresponding one of the bus bars 126A-126C of the second busway section 112 to form a corresponding electrically coupled fixed joint.

In an embodiment, busway system 110 may be arranged to connect to a conventional 3-phase electrical distribution system, and each of the first, second, and third plurality of splice plates 146A-146C, 136A-136C, 156A-156C is arranged and disposed to correspond to a phase or neutral bus within the electrical distribution system. Likewise each fixed and slidable joint disposed in the busway joint 113 and busway system 110 is arranged and disposed to correspond to a phase or neutral bus within the electrical distribution system. In an embodiment, the corresponding splice plates across the busway joint 113 are offset with respect to one another to retain phase centering across the splice plate electrical joint.

Since the splice plates of the first plurality of splice plates 146A-146C, may each be associated with a different electrical phase, the busway joint 113 may additionally comprise a first plurality of non-metallic first insulator plates 175 positioned or interleaved between any of the first plurality of splice plates 146A-146C to electrically insulate any of the first plurality of splice plates 146A-146C associated with one electrical phase from any of the first plurality of splice plates 146A-146C, associated with a different electrical phase.

Since the splice plates of third plurality of splice plates 156A-156C may each be associated with a different electrical phase, the busway joint 113 may additionally comprise a second plurality of non-metallic first insulator plates 175 positioned or interleaved between any of the third plurality of splice plates 156A-156C, to electrically insulate any of the third plurality of splice plates 156A-156C, associated with one electrical phase from any of the third plurality of splice plates 156A-156C associated with a different electrical phase.

Since the second plurality of splice plates 136A-136C may each be associated with a different electrical phase, various embodiments may additionally comprise a second plurality of non-metallic second insulator plates 177 positioned or interleaved between the any of the second plurality of splice plates 136A-136C to electrically insulate any of the second plurality of splice plates 136A-136C associated with one electrical phase from any of the second plurality of splice plates 136A-136C associated with a different electrical phase.

Additionally in an embodiment, to electrically insulate the housing 163 from any of the enclosed splice plates 136A-136C, 146A-146C, 156A-156C therein, the busway joint 113 may comprise one or more non-metallic housing insulator plates 289 (not shown) positioned or interleaved between the housing first and second top surfaces 123a, 123b and any adjacent splice plate of the first, second, and third plurality of splice plates 136A-136C, 146A-146C 156A-156C of any phase; and between the housing first and second bottom surfaces 124a, 124b and any adjacent splice plate of the first and second plurality of splice plates 136A-136C, 146A-146C, 156A-156C of any phase.

Figure 7:
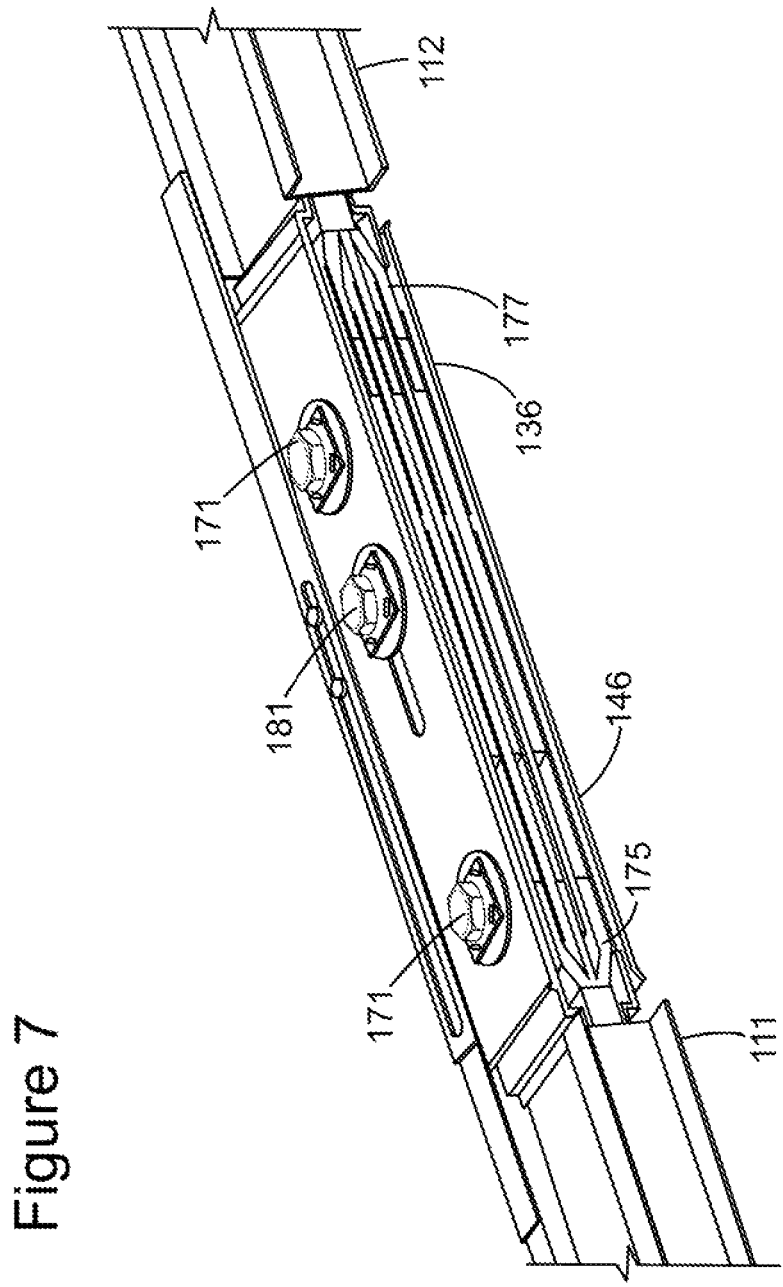
FIG. 7 is a perspective view of the busway system of FIG. 3, according to an embodiment, in a first compressed position with one of the busway joint housing sides removed for clarity.
Figure 7B:
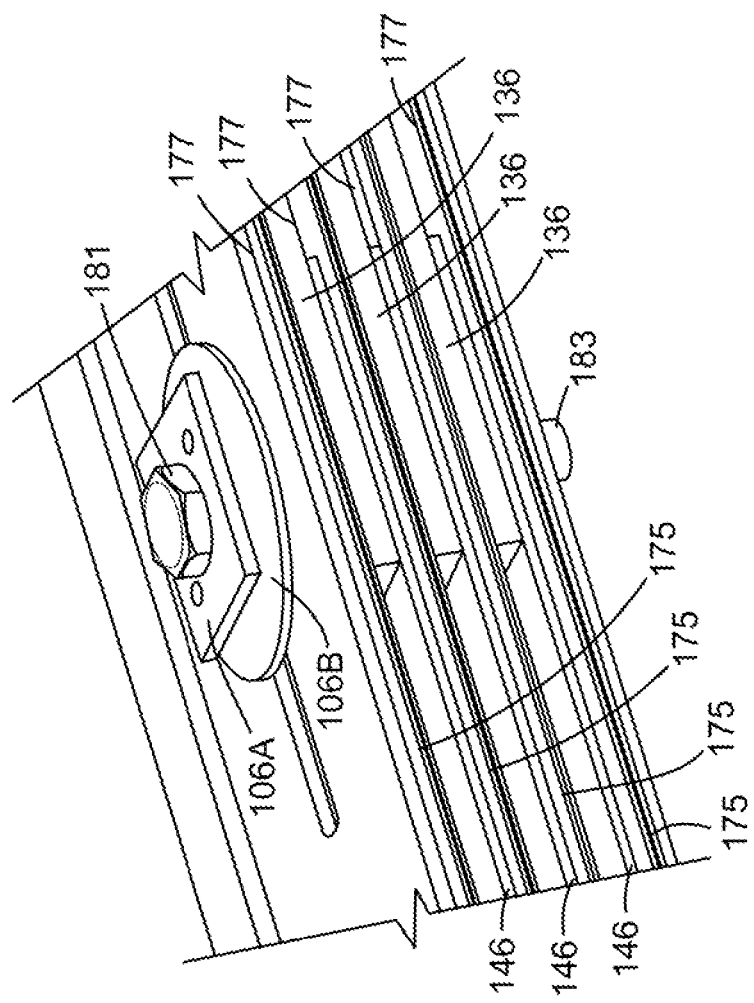
FIG. 7B is a perspective detail view of an embodiment of the busway system of FIG. 7A.
Figure 7C:
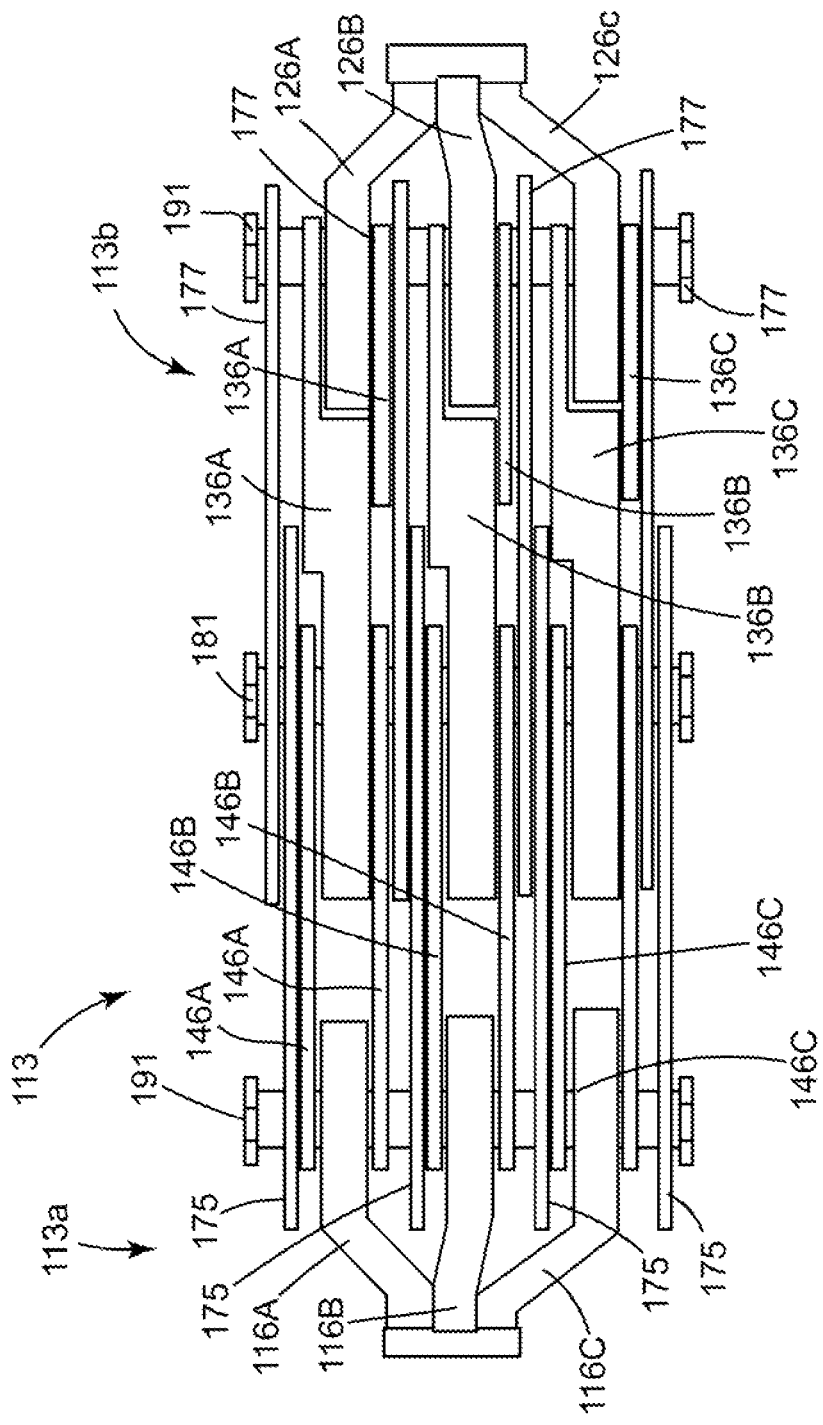
FIG. 7C is a side view of the busway system of FIG. 3, according to an embodiment, in a first compressed position with busway section housings and busway joint housing removed for clarity.
Figure 7D:
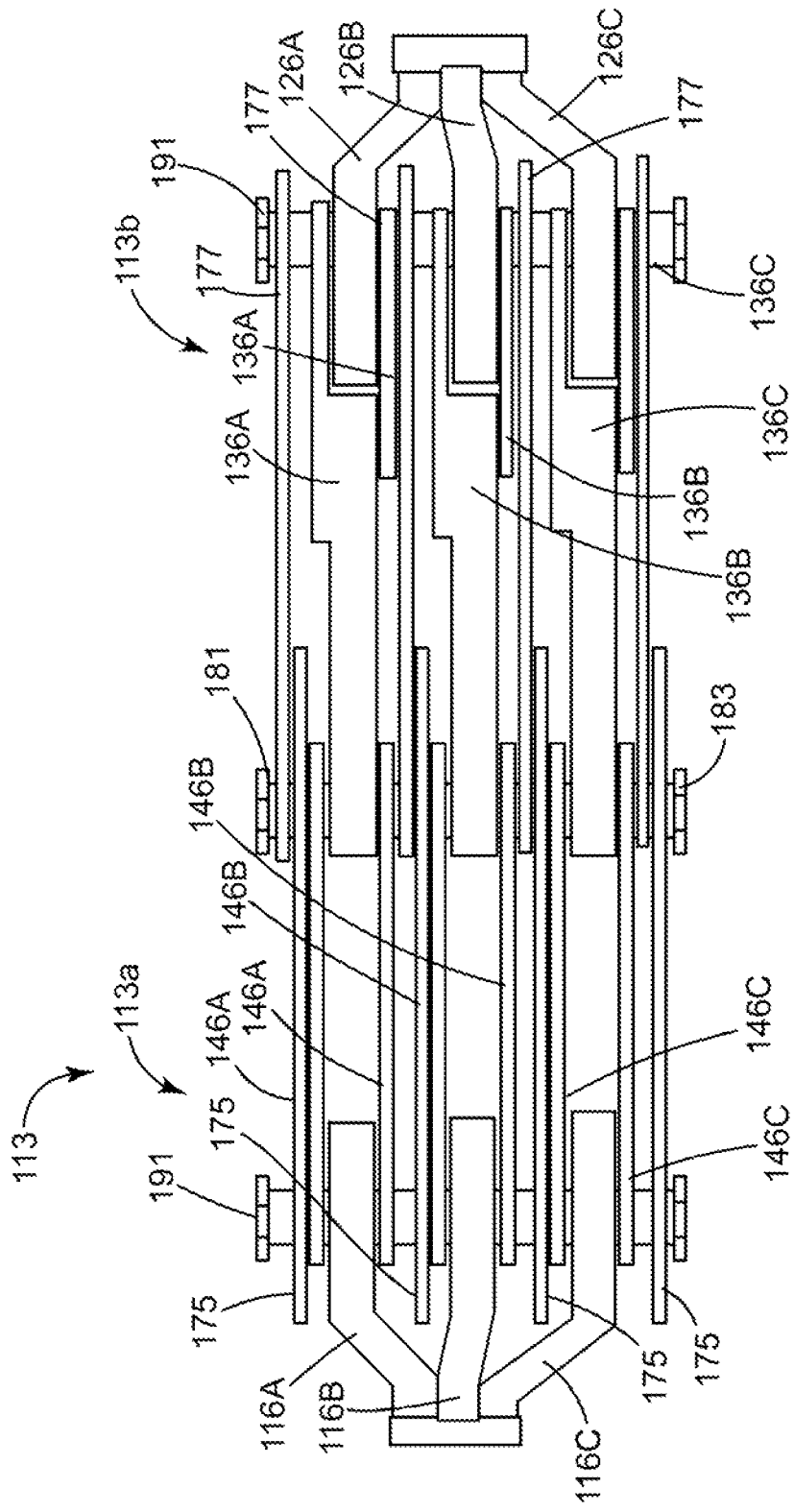
FIG. 7D is a side view of the busway system of FIG. 3, according to an embodiment, in a second extended position with the busway section housings and busway joint housing removed for clarity.

For example, in one embodiment in FIGS. 7C, 7D, an embodiment of a busway joint 113 is shown having a first plurality of splice plates comprising six splice plates 146A-146C, and a second plurality of splice plates comprising six splice plates 136A-136C within housing 163, wherein four first splice plate insulators 177, and four second splice plate insulators 175 are disposed as described herein. Additionally, in other exemplary embodiments, a housing insulator 389 (not shown) is disposed adjacent the top surfaces 123a, 123b, and a housing insulator 389 (not shown) is disposed adjacent the bottom surfaces 124a, 124b. However it should be understood that other embodiments are not so limited and may comprise any desired number of insulators 175, 177, and 389 that enable busway joint 113 to function as described herein.

In an embodiment, the first and second pluralities of splice plates 146A-146C, 136A-136C are operably configured for longitudinal movement with respect each other adjustment (i.e., along the direction indicated by the double headed arrow "X"), between a first compressed position and a second extended position. Likewise, in other embodiments, the second and third pluralities of splice plates 136A-136C, 156A-156C are operably configured for longitudinal movement with respect each other, between a third compressed position and a fourth extended position. In an embodiment, each of the first, second, third, and fourth positions of the splice plates 146A-146C, 136A-136C, and 156A-156C may be associated with one of a first compressed position and second expanded position of the busway joint 113.

Figure 8:
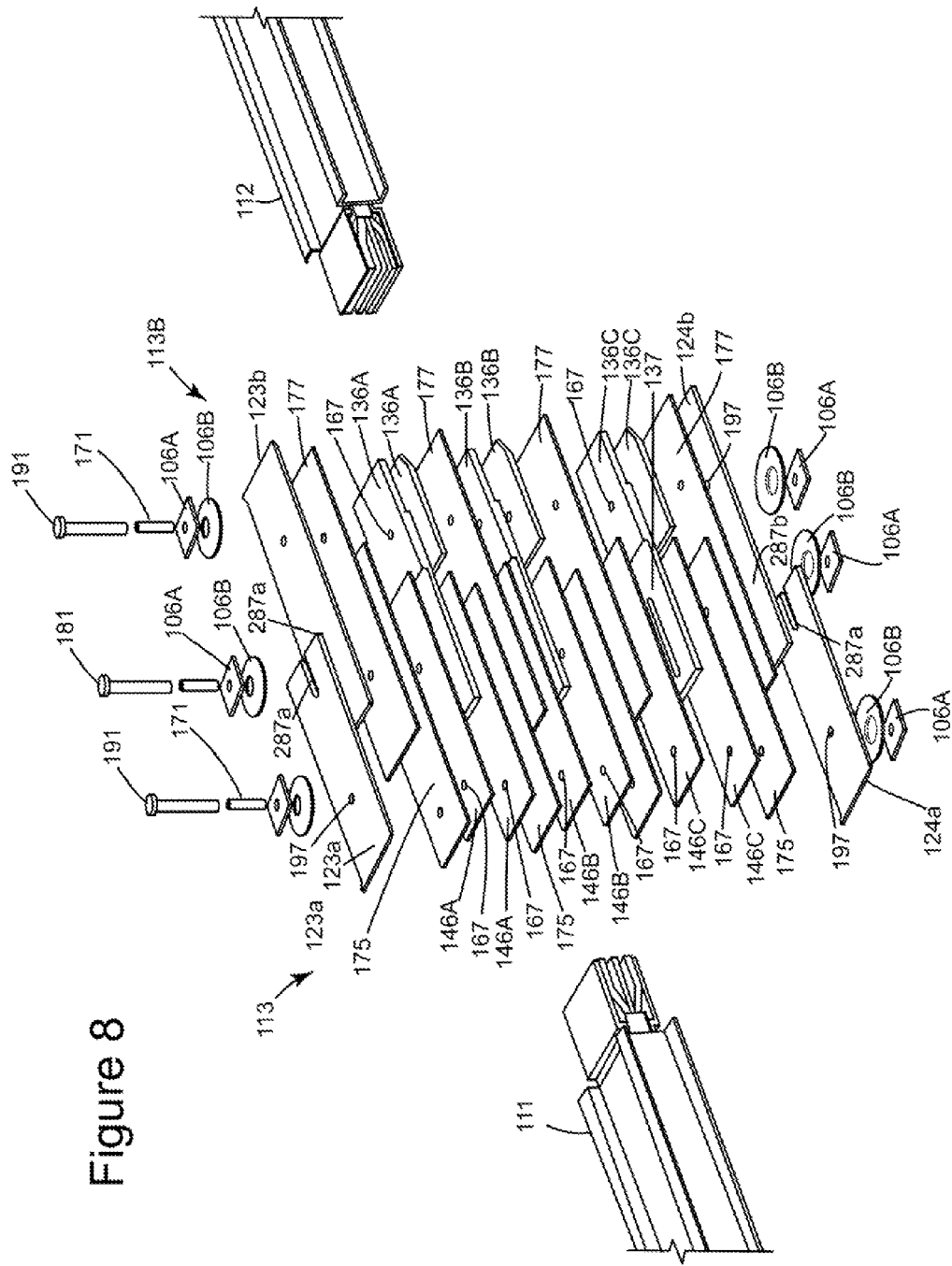
FIG. 8 is a perspective view of a busway system according to an embodiment, in an unconnected state with the busway joint shown in exploded view.
Figure 9:
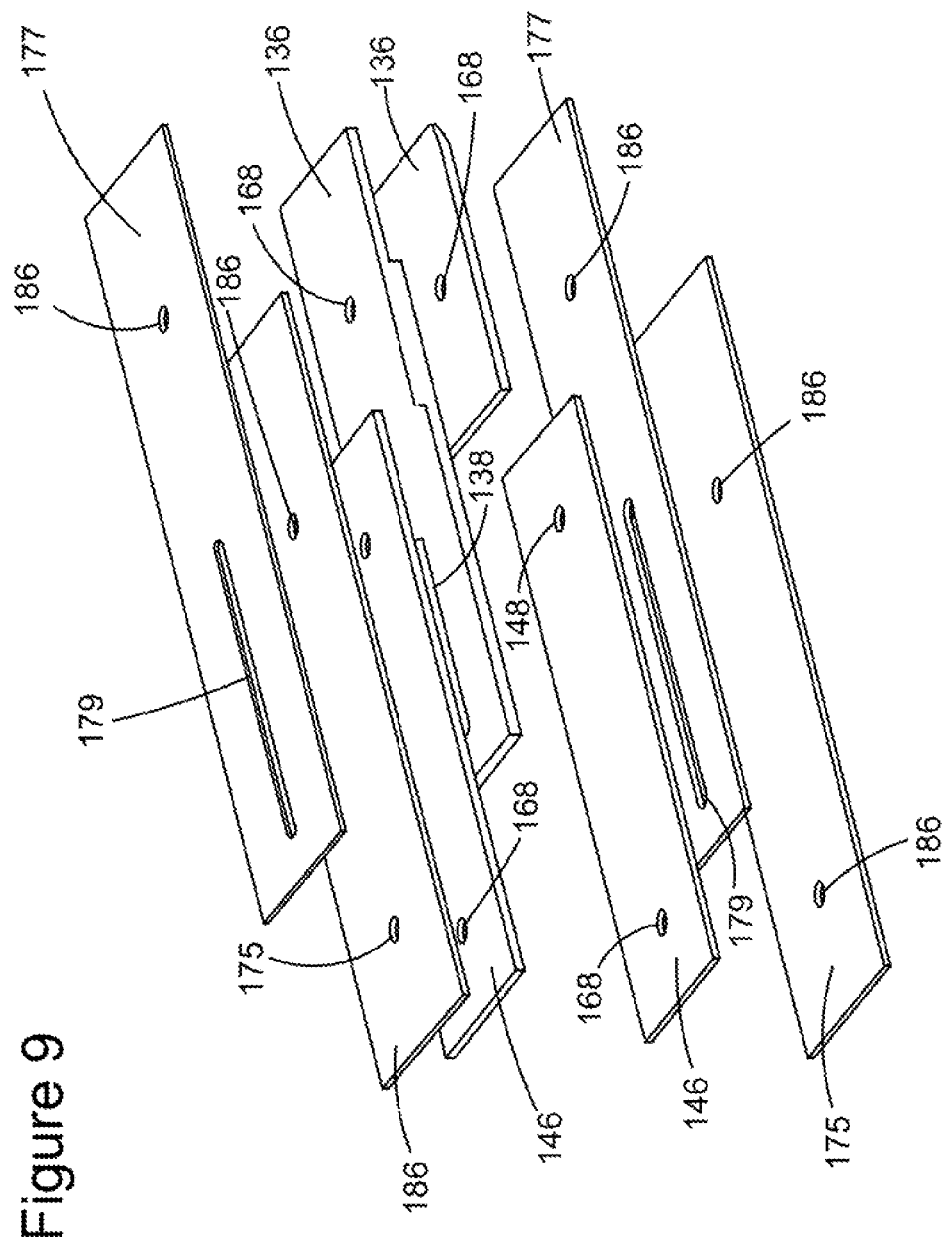
FIG. 9 is a perspective view of the splice plates and insulator plates of an exemplary single-phase busway joint according to an embodiment, with the splice plates and insulator plates shown in exploded view, and all other parts omitted for clarity.

As shown in FIGS. 8, 8A, and 9, the first plurality of splice plates 146A-146C comprise at least one respective first splice plate first retaining portion 147. For example, in an embodiment, the first retaining portion 147 may include a mutually aligned splice plate first retaining aperture 148 defined in each splice plate of the first plurality of splice plates 146A-146C.

As shown in FIGS. 8, 8A, and 9, the third plurality of splice plates 156A-156C comprise at least one respective third splice plate first retaining portion 147. For example, in an embodiment, the third splice plate first retaining portion 147 may include a mutually aligned splice plate first retaining aperture 148 defined in and each splice plate of the third plurality of splice plates 156A-156C.

Additionally, in an embodiment, the first plurality of splice plates 146A-146C comprise at least one respective first splice plate second retaining portion 167. For example, in an embodiment, the first splice plate second retaining portion 167 may include a mutually aligned first splice plate second retaining aperture 168 defined in each splice plate of the first plurality of splice plates 146A-146C.

Additionally, in an embodiment, at least one of the second plurality of splice plates 136A-136C and the third plurality of splice plates 156A-156C may each comprise at least one of a respective second and third splice plate second retaining portion 167. For example, in an embodiment, the second splice plate second retaining portion 167 may include a mutually aligned third splice plate second retaining aperture 168 defined in each splice plate of the third plurality of splice plates 136A-136C. In another embodiment, the third splice plate second retaining portion 167 may include a mutually aligned third splice plate second retaining aperture 168 defined in each splice plate of the third plurality of splice plates 156A-156C.

In an embodiment, the busway joint housing top and bottom surfaces 123, 124 further each comprise at least one housing surface first retaining portion 197. For example in an embodiment, the busway joint housing first and second top surfaces 123a, 123b each define a respective housing surface first top surface retaining aperture 198, and the busway joint housing first and second bottom surfaces 124a, 124b each define a respective housing portion first bottom surface retaining aperture 198.

Additionally, in other embodiments, the at least one of the busway joint housing top and bottom surfaces 123, 124 further comprise at least one housing surface second retaining portion 297. For example in an embodiment, the busway joint housing first and second top surfaces 123a, 123b each define a respective housing surface second top surface retaining aperture 298, and the busway joint housing first and second bottom surfaces 124a, 124b each define a respective housing portion second bottom surface retaining aperture 298.

In an embodiment, the first plurality of non-metallic first insulator plates 175 positioned or interleaved between any of the first plurality of splice plates 146A-146C each comprise at least one respective first insulator plate first retaining portion 176. For example, in an embodiment, the first insulator plate first retaining portion 176 may include a first insulator plate first retaining aperture 186 defined in each non-metallic first insulator plates 175.

In other embodiments, the second plurality of non-metallic first insulator plates 175 positioned or interleaved between any of the third plurality of splice plates 156A-156C, each comprise at least one respective first insulator plate first retaining portion 176. For example, in an embodiment, the first insulator plate first retaining portion 176 may include a first insulator plate first retaining aperture 186 defined in each non-metallic first insulator plates 175.

In an embodiment, the first plurality of non-metallic first insulator plates 175 positioned or interleaved between any of the first plurality of splice plates 146A-146C each comprise at least one respective first insulator plate second retaining portion 276. For example, in an embodiment, the first insulator plate second retaining portion 276 may include a first insulator plate second retaining aperture 286 defined in each non-metallic first insulator plates 175.

In other embodiments, the second plurality of non-metallic first insulator plates 175 positioned or interleaved between any of the third plurality of splice plates 156A-156C each comprise at least one respective first insulator plate second retaining portion 276. For example, in an embodiment, the first insulator plate second retaining portion 276 may include a first insulator plate second retaining aperture 286 defined in each non-metallic first insulator plates 175.

The second plurality of splice plates 136A-136C define a splice plate first adjustment portion 137, having a first operative longitudinal dimension "D". For example in an embodiment, the first adjustment portion 137 may include a mutually aligned and longitudinally disposed splice plate first adjustment slot 138 defined in each splice plate of the second plurality of splice plates 136A-136C. In an embodiment, the splice plate first adjustment portion 137 may alternatively comprise a plurality of mutually aligned longitudinally disposed splice plate adjustment apertures (not shown) disposed along corresponding splice plates of the second plurality of splice plates 136A-136C.

In some embodiments, the second plurality of splice plates 136A-136C further define a second splice plate second adjustment portion 237, having a second longitudinal dimension "S", such as a mutually aligned and longitudinally disposed splice plate second adjustment slot 238 defined in each splice plate of the second plurality of splice plates 136A-136C. In another embodiment, the second splice plate second adjustment portion 237 comprises a plurality of longitudinally disposed and mutually aligned second splice plate second adjustment apertures (not shown) disposed on corresponding splice plates of the second plurality of splice plates 136A-136C.

In an embodiment, the busway joint housing first top surface, and first bottom surface 123a, 124a, each define a respective joint housing first top and first bottom surface first adjustment portion 287a. For example in an embodiment, the respective first top and first bottom surface first adjustment portions 287a may include a longitudinally disposed first top surface 123a and first bottom surface 124a first adjustment slots 288a defined the respective first top surface 123a, and first bottom surface 124a.

In an embodiment, the busway joint housing second top surface, and second bottom surface 123b, 124b, each define a respective joint housing second top and second bottom surface first adjustment portion 287b. For example in an embodiment, the respective second top and second bottom surface 123b, 124b first adjustment portions 287b may include a longitudinally disposed second top surface 123b and second bottom surface 1241 first adjustment slots 288b defined the respective second top surface 123b, and second bottom surface 124b.

In an embodiment, the respective busway joint housing second top and second bottom surface first adjustment portion 287a are operably disposed to overlap the respective joint housing second top and second bottom surface first adjustment portion 287b. In an embodiment, the operative longitudinal dimension of the overlapping first and second adjustment portions 287a, 287b may be equal to the second splice plate second adjustment portion 137 operative longitudinal dimension "D".

Additionally, in another embodiment, the busway joint housing third top surface, and third bottom surface 123c, 124c, each define a respective joint housing third top and third bottom surface first adjustment portion 287. For example, in an embodiment, the respective third top and third bottom first adjustment portion 287 may include a longitudinally disposed third top and third bottom surface 123c, 124c first adjustment slot 288 defined each third top surface 123c, and third bottom surface 124c, and having a first operative longitudinal dimension at least equal to the second splice plate first adjustment portion 137 operative longitudinal dimension "D".

Additionally, in an embodiment, the busway joint housing third top surface, and third bottom surface 123c, 124c, each define a respective joint housing third top and third bottom second adjustment portion 387. For example, in an embodiment, the respective third top and third bottom surface second adjustment portions 387 may include a longitudinally disposed top and bottom third surface 123c, 124c second adjustment slot 388 defined each third top surface, and third bottom surface 123c, 124c and having a first operative longitudinal dimension at least equal to the second splice plate second adjustment portion 137 operative longitudinal dimension "S".

In an embodiment, the second insulator plates 177 positioned or interleaved between the any of the second plurality of splice plates 136A-136C, each comprise at least one respective second insulator plate first adjustment portion 178. In an embodiment, the second insulator plate first adjustment portion 178 may include a mutually aligned and longitudinally second insulator plate first adjustment slot 179 defined each second insulator plate 177. In an embodiment, the second insulator plate first adjustment portion 178 may alternatively comprise a plurality of mutually aligned longitudinally disposed splice plate adjustment apertures (not shown) disposed along corresponding insulator plates 177.

In an embodiment, the second insulator plates 177 positioned or interleaved between the any of the second plurality of splice plates 136A-136C, each comprise at least one respective second insulator plate second adjustment portion 278. In an embodiment, the second insulator plate first adjustment portion 278 may include a mutually aligned and longitudinally second insulator plate first adjustment slot 279 defined each second insulator plate 177. In an embodiment, the second insulator plate first adjustment portion 178 may alternatively comprise a plurality of mutually aligned longitudinally disposed splice plate adjustment apertures (not shown) disposed along corresponding insulator plates 177.

In an embodiment, the first adjustment portion 137 of each splice plate of the second plurality of splice plates 136A-136C is sized and disposed to operatively overlap the corresponding joint housing first top surface 123a first adjustment portion 287a, the first bottom surface 124b first adjustment portion 287a, the first plurality of splice plates 146A-146C first retaining portion 147, first insulator plate 175 first retaining portion 176, and the second insulator plate 177 first adjustment portion 178. In another embodiment, the first adjustment portion 137 of each splice plate of the second plurality of splice plates 136A-136C is sized and disposed to operatively overlap the corresponding joint housing first top surface 123a first adjustment portion 287a, the first bottom surface 124a first adjustment portion 287a, second top surface 123b first adjustment portion 287b, the second bottom surface 124b first adjustment portion 287b, the first plurality of splice plates 146A-146C first retaining portion 147, first insulator plate 175 first retaining portion 176, and the second insulator plate 177 first adjustment portion 178.

In yet another embodiment, the first adjustment portion 137 of each splice plate of the second plurality of splice plates 136A-136C is sized and disposed to operatively overlap the corresponding joint housing first top surface 123a first retaining portion 197, third top surface 123c first adjustment portion 287, the third bottom surface 124c first adjustment portion 287, the first bottom surface 124a first retaining portion 197, the first plurality of splice plates 146A-146C first retaining portion 147, first insulator plate 175 first retaining portion 176, and the second insulator plate 177 first adjustment portion 178. Similarly, the second adjustment portion 237 of each splice plate of the second plurality of splice plates 136A-136C is disposed to operatively overlap the corresponding joint housing second top surface 123b first retaining portion 197, the joint housing third top surface first adjustment portion 287, the second bottom surface 124b first retaining portion 197, the joint housing third bottom surface first adjustment portion 287, and the third plurality of splice plates 156A-156C first retaining portion 117, the first insulator plate first retaining portions 176, and the second insulator plate 177 second adjustment portions 278.

Referring to FIG. 8, each busway joint 113 also comprises at least one first positioning guide member 181 respectively disposed in the overlapped corresponding first adjustment portion 137 of each splice plate of the second plurality of splice plates 136A-136C, the corresponding joint housing first top surface 123a first adjustment portion 287a, the first bottom surface 124b first adjustment portion 287a, the first plurality of splice plates 146A-146C first retaining portion 147, first insulator plate 175 first retaining portion 176, and the second insulator plate 177 first adjustment portion 178, in another embodiment, the at least one first positioning guide member 181 is respectively disposed in the overlapped first adjustment portion 137 of each splice plate of the second plurality of splice plates 136A-136C, the joint housing first top surface 123a first adjustment portion 287a, the first bottom surface 124a first adjustment portion 287a, second top surface 123b first adjustment portion 287b, the second bottom surface 124b first adjustment portion 287b, the first plurality of splice plates 146A-146C first retaining portion 147, first insulator plate 175 first retaining portion 176, and the second insulator plate 177 first adjustment portion 178.

Referring to FIG. 8, in yet another embodiment, the busway joint 113 may comprise the at least one first positioning guide member 181 respectively disposed in the overlapped corresponding first adjustment portion 137 of each splice plate of the second plurality of splice plates 136A-136C, joint housing first top surface 123a first retaining portion 197, third top surface 123c first adjustment portion 287, the third bottom surface 124c first adjustment portion 287, the first bottom surface 124a first retaining portion 197, the first plurality of splice plates 146A-146C first retaining portion 147, first insulator plate 175 first retaining portion 176, and the second insulator plate 177 first adjustment portion 178.

Similarly, in an embodiment, the busway joint 113 may also comprises at least one second positioning guide member 181 respectively disposed in the overlapped corresponding second adjustment portion 237 of each splice plate of the second plurality of splice plates 136A-136C, the joint housing second top surface 123b first retaining portion 197, the joint housing third top surface 123c second retaining portion 387, the second bottom surface 124b first retaining portion 197, the joint housing third bottom surface 124b second adjustment portion 387, and the third plurality of splice plates 156A-156C first retaining portion 147, the first insulator plate first retaining portions 176, and the second insulator plate 177 second adjustment portions 278.

The first and second positioning guide members 181 are operative to guide the respective positioning of the first, second and third pluralities of splice plates 146A-146C, 136A-136C, 156A-156C first and second insulator plates 175, 177, and housing top and bottom first second and third surfaces 123a, 123b, 123c, 124a, 124b, 124c. The first and second positioning guide members 181 may additionally operatively clamp or fixedly retain the respective relative positions of the first, second, and third pluralities of splice plates 146A-146C, 136A-136C, 156A-156C, first and second insulator plates 175, 177, and housing top and bottom first second and third surfaces 123a, 123b, 123c, 124a, 124b, 124c in a desired overlapped position.

In an embodiment, first and second positioning guide members 181 are operative to releasably prevent an undesired lateral adjustment of the busway joint 113 length and to vary the pressure exerted to permit selective connecting and disconnecting of the electrical joint. For example in one embodiment, first and second positioning guide members 181 are threaded bolts configured to cooperate with a respective pressure member 106, such as at least one respective pressure plate or disc spring washer configured to be rotatably mounted to first and second positioning guide member 181, and a respective nut 183 arranged for threadable engagement with first and second positioning guide member 181. In an embodiment, the pressure member 106 comprises a rectangular washer 106A and a spring washer 106B. In other embodiments, rectangular washer 106A may be threaded. For example, the busway joint 113 top surface 123 and bottom surface 124 are fastened to each other and to the busway joint 113 by first and second positioning guide members 181, rectangular washers 106A, and spring washers 106B.

In various embodiments, the at least one first positioning guide member 181 is formed of a conductive material, such as steel, and a non-metallic insulating tube 171 is additionally disposed within the respective splice plate, insulator plate, and housing first retaining portions, and splice plate, insulator plate, and housing adjustment portions, and sized and disposed to receive the first positioning guide member 181, and operative to electrically insulate any of the first, second, and third plurality of splice plates 146A-146C, 136A-136C, 156A-156C from the first positioning guide member 181.

In one embodiment, the longitudinally disposed splice plate adjustment portions 137, 237, insulator adjustment portions 177, and housing top and bottom adjustment portions 287 cooperate with the first and second positioning guide members 181 to at least partially determine the operable distance between the first compressed position and the second extended position. For example, in an embodiment having a splice plate first adjustment portion 137 having a first longitudinal dimension "D", and a splice plate second adjustment portion 137 having a longitudinal dimension "S", the distance between the first compressed position and the second extended position of busway joint 113 may be equal to or less than the sum of the first and second longitudinal dimension "D+S". In another embodiment, the operative position of the first positioning guide member 181 within each splice plate adjustment slot 138, at least partially determines the length, or distance between the first compressed position and the second extended position of busway joint 113.

In an embodiment, the first plurality of splice plates 146A-146C second retaining portion 167 is disposed to operatively align with or overlap the corresponding joint housing first top surface 123a second retaining portion 297, the first bottom surface 124a second retaining portion 297, and the first insulator plate 175 second retaining portion 176.

In an embodiment, the second plurality of splice plates 136A-136C second retaining portion 167 is disposed to operatively align with or overlap the corresponding joint housing second top surface 123b second retaining portion 297, the second bottom surface 124b second retaining portion 297, and the first insulator plate 175 second retaining portion 276.

In another embodiment, the third plurality of splice plates 156A-156C second retaining portion 167 is disposed to operatively align with or overlap the corresponding joint housing second top surface 123b second retaining portion 297, the second bottom surface 124b second retaining portion 297, and the first insulator plate 175 second retaining portion 276.

In an embodiment, each busway joint 113 may also comprise at least one first clamp member 191 respectively disposed in the aligned corresponding second retaining portion 167 of the first plurality of splice plates 146A-146C, the joint housing first top surface 123a second retaining portion 297, the first bottom surface 124a second retaining portion 297, and the first insulator plate 175 second retaining portion 176. The first clamp member 191 operatively clamps or fixedly retains the relative positions of the respective first plurality of splice plates 146A-146C, the joint housing first top surface 123a, the joint housing first bottom surface 124a, and the first insulator plates 175. In various embodiments, at least one first clamp member 191 is operative to selectively connect and disconnect at least one of busbars 116A-116C of the first busway section 111 and the first plurality of splice plates 146A-146C in a pressure type electrical joint. First clamp member 191 is operative to vary the pressure exerted to permit selective connecting and disconnecting of the electrical joint.

In an embodiment, each busway joint 113 may also comprise at least one second clamp member 191 respectively disposed in the overlapped second retaining portion 167 of the second plurality of splice plates 136A-153C, the joint housing second top surface 123b second retaining portion 297, the second bottom surface 124b second retaining portion 297, and the first insulator plate 175 second retaining portion 276. The second clamp member 191 operatively clamps or fixedly retains the relative positions of the respective second plurality of splice plates 136A-136C, the joint housing second top surface 123b, the joint housing second bottom surface 124b, and the first insulator plates 175. In various embodiments, at least one second clamp member 191 is operative to selectively connect and disconnect at least one of busbars 126A-126C of the second busway section 112 and the second plurality of splice plates 136A-136C in a pressure type electrical joint. Second clamp member 191 is operative to vary the pressure exerted to permit selective connecting and disconnecting of the electrical joint.

In another embodiment, each busway joint 113 may also comprise at least one second clamp member 191 respectively disposed in the overlapped, second retaining portion 167 of the third plurality of splice plates 156A-156C, the joint housing second top surface 123b second retaining portion 297, the second bottom surface 124b second retaining portion 297, and the first insulator plate 175 second retaining portion 276. The second clamp member 191 operatively clamps or fixedly retains the relative positions of the respective third plurality of splice plates 156A-156C, the joint housing second top surface 123b, the joint housing second bottom surface 124b, and the first insulator plates 175. In various embodiments, at least one second clamp member 191 is operative to selectively connect and disconnect at least one of busbars 126A-126C of the second busway section 112 and the third plurality of splice plates 156A-156C in a pressure type electrical joint. Second clamp member 191 is operative to vary the pressure exerted to permit selective connecting and disconnecting of the electrical joint.

In an embodiment, the first and second clamp members 191 may be identical to first positioning guide member 181. In various embodiments, the first and second clamp members 191 are formed of a conductive material, such as steel, and a non-metallic insulating tube 171, sized and disposed to receive at least one of the first and second the clamp members 191, is additionally disposed in the splice plate, insulator plate, and housing second retaining portions, and is operative to electrically insulate any of the first, second, and third plurality of splice plates 146A-146C, 136A-136C, 156A-156C from the first and second clamp members 191.

For example in one embodiment, first and second clamp members 191 are threaded bolts configured to cooperate with a respective pressure member 106, such as at least one respective pressure plate or disc spring washer configured to be rotatably mounted to first and second clamp member 191, and a respective nut 183 arranged for threadable engagement with first and second clamp member 191. In an embodiment, the pressure member 106 comprises a rectangular washer 106A and a spring washer 106B. In other embodiments, rectangular washer 106A may be threaded. For example, the busway joint 113 top surface 123 and bottom surface 124 are fastened to each other and to the busway joint 113 by first and second clamp members 191, rectangular washers 106A, and spring washers 106B.

In operation, and to effect easy installation of the busway system, the busway joint 113 is first compressed by moving the busway joint 113 longitudinally. For example by loosening each position guide member 181 and clamp member 191 the busway joint 113 may be telescoped from the second extended position to the first compressed position to shorten the busway joint 113 length. When both busway sections 111, 112 are offset in end-to-end relation for establishing an electrical joint therebetween, and the busway joint 113 is recessed in the first compressed position, transverse movement relative to busway section 111 in a plane parallel with the planes of the busbars of the first and second busway sections 111, 112 is permitted. In an embodiment, the second busway section 112 is mated with the busway joint 113 so that the ends of corresponding busbars 126A-126C and third plurality of splice plates 156A-156C are interleaved or overlapped into respective electrically coupled joints and the corresponding clamp member 191 tightened. The busway joint 113 may then be longitudinally extended in the reverse direction, that is, extended by a user from the first compressed position to the second extended position toward the first busway section 111 so that the ends of corresponding busbars 116A-116C, and first plurality of splice plates 146A-146C are interleaved or overlapped into respective electrically coupled joints and at least one of the corresponding clamp member 191 and the position guide member 181 tightened to establish the electrical joint between the two successive busway sections 111, 112.

While the Figures generally illustrate three busbars in each of the busway sections, it should be understood that other embodiments are not so limited and may comprise any desired number of busbars and may be configured to connect with any number of electrical phases.

In various embodiments, it is contemplated that any desired number of splice plate portions, having any desired number of retaining portions and any desired number of adjustment portions, may be used that enable busway joint 113 to function as described herein. Moreover, while first, second, and third splice plate portions 146, 136, 156 are shown in the figures and discussed herein as each comprising six splice plates, it should be understood that other embodiments are not so limited and the any desired number of splice plate portions 146, 136, 156 may each comprise any desired number of splice plates and any desired number of splice plates per electrical phase or neutral, that enables busway system 110 to function as described herein.

Exemplary embodiments of a busway joint, a busway system, and a method of installing a busway joint are described above in detail. The busway joint, a busway system, and a method of installing a busway joint are not limited to the specific embodiments described herein, but rather, components of the system and/or busway joint and/or steps of the method may be utilized independently and separately from other components and/or steps described herein. For example, the busway joint may also be used in combination with other busway systems and methods, and is not limited to practice with only the busway as described herein. Rather, the exemplary embodiment can be implemented and utilized in connection with many other electrical applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A busway system, comprising:
   a first electrical busway section;
   a second electrical busway section, said first and said second busway sections being configured to be electrically coupled and disposed longitudinally offset from each other;
   a busway joint disposed between and operative to couple said first and said second electrical busway sections, the busway joint comprising
   a first plurality of electrically conductive splice plates disposed in spaced apart substantially parallel relationship, each splice plate of said first plurality of splice plates defining a first splice plate first retaining portion;
   a second plurality of electrically conductive splice plates disposed in spaced apart substantially parallel relationship, each splice plate of said second plurality of splice plates disposed to overlap a portion of a corresponding splice plate of said first plurality of splice plates to form an electrical joint, each splice plate of said second plurality of splice plates defining a splice plate first adjustment portion substantially longitudinally aligned with said first plurality of splice plates and operably disposed to overlap a portion of a corresponding said first splice plate first retaining portion;
   at least one first positioning member sized and configured to be operably disposed in said first splice plate first retaining portion and said second splice plate first adjustment portion;
   said first and said second pluralities of splice plates being arranged for a longitudinal movement with respect each other between a first compressed position and a second extended position.

2. The busway system of claim 1 wherein said busway joint further comprises:
   at least one first clamping member;
   each splice plate of said first plurality of splice plates further defines a first splice plate second retaining portion; and
   said at least one first clamping member is configured to be operably disposed in said first splice plate second retaining portion.

3. The busway system of claim 1, wherein said busway joint further comprises:
   at least one second clamping member;
   each said splice plate of the second plurality of splice plates further defines a second splice plate second retaining portion; and
   said at least one second clamping member is configured to be operably disposed in said second splice plate second retaining portion.

4. The busway system of claim 1, wherein said busway joint further comprises:
   a third plurality of electrically conductive splice plates, disposed in spaced apart substantially parallel relationship, each splice plate of the said third plurality of splice plates defining a third splice plate first retaining portion;
   each said splice plate of said second plurality of electrically conductive splice plates further disposed to overlap a portion of a corresponding splice plate of said third plurality of splice plates to form an electrical joint, each splice plate of said second plurality of splice plates defining a splice plate second adjustment portion substantially longitudinally aligned with said third plurality of splice plates and operably disposed to overlap a portion of a corresponding said third splice plate first retaining portion; and at least one second positioning member configured to be operably disposed in said splice plate second adjustment portion and said third splice plate first retaining portion;

said third and said second pluralities of splice plates being arranged for a longitudinal movement with respect each other between a third compressed position and a fourth extended position.

5. The busway system of claim 2, wherein said busway joint further comprises:

a first plurality of insulators, at least one insulator of said plurality of insulators disposed therebetween each splice plate of said first plurality of splice plates to insulate each splice plate of said first plurality of splice plates from each other.

6. The busway system of claim 2, wherein said busway joint further comprises:

a second plurality of insulators, at least one insulator of said plurality of insulators disposed therebetween each splice plate of said second plurality of splice plates to insulate each splice plate of said second plurality of splice plates from each other.

7. The busway system of claim 4, wherein said busway joint further comprises:

a third plurality of insulators, at least one insulator of said third plurality of insulators disposed therebetween at least one splice plate of said third plurality of splice plates to insulate said at least one splice plate of said third plurality of splice plates from each other.

8. The busway system of claim 1, wherein each splice plate of said first plurality of splice plates, and each said corresponding splice plate of said second plurality of splice plates, and each said corresponding splice plate of said third plurality of splice plates is associated with one of a distinct electrical phase, ground, or neutral.

9. The busway system of claim 1, wherein said busway joint further comprises:

a housing comprising a first housing; portion, and a second housing portion, at least one of said first and said second housing portions configured and arranged for a longitudinal movement with respect each other, between a first compressed position and a second extended position;

said first, and said second plurality of electrically conductive splice plates being at least partially disposed within said housing.

10. The busway system of claim 9, wherein a portion of said first housing portion is arranged and disposed to overlap at least a portion of said second housing portion.

* * * * *

UNITED STATES PATENT AND TRADEMARK OFFICE
CERTIFICATE OF CORRECTION

PATENT NO. : 8,900,002 B2  
APPLICATION NO. : 13/338465  
DATED : December 2, 2014  
INVENTOR(S) : Mooney et al.

Page 1 of 2

It is certified that error appears in the above-identified patent and that said Letters Patent is hereby corrected as shown below:

On the Title Page, in Item (57), under "ABSTRACT", in Column 2, Line 14, delete "with respect each other" and insert -- with respect to each other --, therefor.

IN THE SPECIFICATION

In Column 2, Line 17, delete "with respect each other" and insert -- with respect to each other --, therefor.

In Column 2, Line 42, delete "with respect each other" and insert -- with respect to each other --, therefor.

In Column 6, Line 41, delete "with respect each other," and insert -- with respect to each other, --, therefor.

In Column 6, Lines 45-46, delete "with respect each other," and insert -- with respect to each other, --, therefor.

In Column 6, Lines 49-50, delete "with respect each other" and insert -- with respect to each other --, therefor.

In Column 7, Line 3, delete "121b" and insert -- 124b --, therefor.

In Column 7, Line 27, delete "163, in" and insert -- 163. In --, therefor.

In Column 7, Line 37, delete "(hot shown)" and insert -- (not shown) --, therefor.

In Column 9, Line 37, delete ""H."." and insert -- "H". --, therefor.

In Column 10, Line 16, delete "an" and insert -- so --, therefor.

Signed and Sealed this  
Twenty-seventh Day of October, 2015

Michelle K. Lee  
*Director of the United States Patent and Trademark Office*

IN THE SPECIFICATION

In Column 10, Line 47, delete "116, 156" and insert -- 146, 156. --, therefor.

In Column 12, Line 10, delete "with respect each other" and insert -- with respect to each other --, therefor.

In Column 12, Line 16, delete "with respect each other," and insert -- with respect to each other, --, therefor.

In Column 14, Line 12, delete "1241" and insert -- 124b --, therefor.

In Column 15, Line 42, delete "117," and insert -- 147, --, therefor.

In Column 15, Line 54, delete "178, in" and insert -- 178. In --, therefor.

In Column 18, Line 10, delete "overlapped," and insert -- overlapped --, therefor.

IN THE CLAIMS

In Column 20, Lines 31-32, in Claim 1, delete "with respect each other" and insert -- with respect to each other --, therefor.

In Column 21, Lines 5-6, in Claim 4, delete "with respect each other" and insert -- with respect to each other --, therefor.

In Column 22, Line 12, in Claim 9, delete "housing;" and insert -- housing --, therefor.

In Column 22, Line 15, in Claim 9, delete "with respect each other," and insert -- with respect to each other, --, therefor.